(12) United States Patent
Carey

(10) Patent No.: US 11,910,270 B2
(45) Date of Patent: Feb. 20, 2024

(54) METHOD OF AND DEVICE FOR PERFORMING A TOUCHLESS HANDSHAKE BETWEEN TWO OR MORE MOBILE DEVICE USERS

(71) Applicant: Barbara Carey, Forestville, CA (US)

(72) Inventor: Barbara Carey, Forestville, CA (US)

(*) Notice: Subject to any disclaimer, the term of this patent is extended or adjusted under 35 U.S.C. 154(b) by 325 days.

(21) Appl. No.: 17/355,003

(22) Filed: Jun. 22, 2021

(65) Prior Publication Data

US 2021/0409899 A1   Dec. 30, 2021

Related U.S. Application Data

(60) Provisional application No. 63/044,084, filed on Jun. 25, 2020.

(51) Int. Cl.
| | |
|---|---|
| *H04M 3/42* | (2006.01) |
| *H04W 4/02* | (2018.01) |
| *G06N 20/00* | (2019.01) |
| *H04W 4/30* | (2018.01) |
| *H04W 12/02* | (2009.01) |
| *H04W 4/70* | (2018.01) |

(52) U.S. Cl.
CPC ............ *H04W 4/023* (2013.01); *G06N 20/00* (2019.01); *H04W 4/30* (2018.02); *H04W 4/70* (2018.02); *H04W 12/02* (2013.01)

(58) Field of Classification Search
CPC ....... H04W 4/023; H04W 4/70; H04W 12/02; G06N 20/00
See application file for complete search history.

(56) References Cited

U.S. PATENT DOCUMENTS

| | | | | |
|---|---|---|---|---|
| 2013/0108071 A1* | 5/2013 | Huang | .................... | H04W 4/80 |
| | | | | 381/77 |
| 2020/0008251 A1* | 1/2020 | Cheung | ................. | H04W 12/06 |
| 2021/0092550 A1* | 3/2021 | Ganesan | ................ | G06Q 20/12 |

* cited by examiner

*Primary Examiner* — Erika A Washington
(74) *Attorney, Agent, or Firm* — Haverstock & Owens, A Law Corporation

(57) ABSTRACT

To prevent the spread of Covid-19 and other contagious diseases, a touchless handshake is able to be implemented using mobile devices. The touchless handshake is able to be performed by sending an ultrasonic signal from one device to another (or to multiple devices) which triggers the device to vibrate to simulate a handshake. Additionally, mobile devices are able to be used to send and/or display a wave.

24 Claims, 30 Drawing Sheets

METHOD OF AND DEVICE FOR PERFORMING A TOUCHLESS HANDSHAKE BETWEEN TWO OR MORE MOBILE DEVICE USERS

FIELD OF THE INVENTION

The present invention relates to touchless communication. More specifically, the present invention relates to performing a touchless handshake.

BACKGROUND OF THE INVENTION

To reduce the spread of contagious diseases such as Covid-19, people have been told to avoid close contact with others such as hugging and hand shaking. Some people have promoted fist bumps, elbow taps and foot taps as alternative greetings. However, these still require people to come relatively close to each other (e.g., within 6 feet).

SUMMARY OF THE INVENTION

A touchless handshake utilizing mobile devices is described herein. Users are able to send a touchless handshake via their mobile devices, where the device of the receiving user performs an action to simulate a handshake such as vibrating or vibrating in a specific pattern. Additionally, in an alternative embodiment, mobile devices are able to be used to send and/or display a wave.

DETAILED DESCRIPTION OF THE PREFERRED EMBODIMENT

Figure 1:
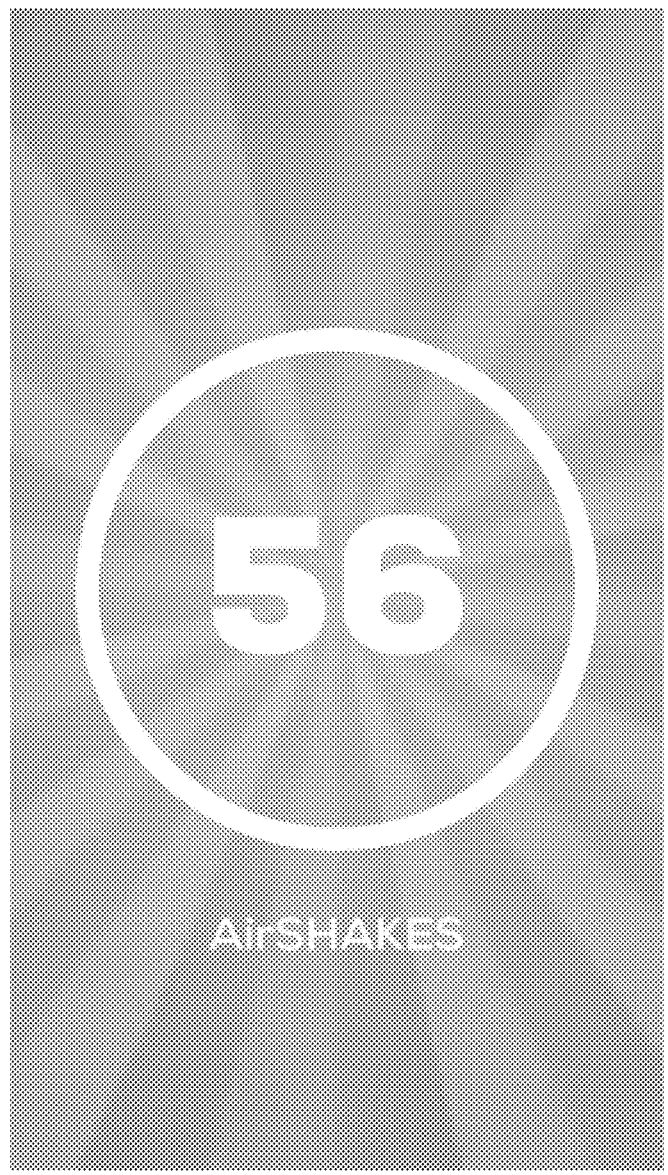
FIG. 1 shows an exemplary screenshot indicating the number of handshakes that have been consummated according to some embodiments.

A touchless connection between two or more mobile phone users that replaces the traditional handshake is described herein. The touchless connection enables users to embrace without physical contact so as to prevent the spread of contagious diseases such as Covid-19. A handshake app enables users to consummate a handshake with user feedback, e.g., sound, visual, vibration such as kinetic motion using heptic technology. In some embodiments, a smart screen saver includes the handshake capabilities. In other words, the handshake app is able to run as a background application. In some embodiments, a handshake is associated with a company (e.g., Google). The company-associated handshake displays a mark or other indicator related to the company.

In alternative embodiments, a user is able to perform a virtual wave at another user. The virtual wave includes the user performing a waving motion or other motion with the mobile device. The mobile device detects the waving motion (e.g., using accelerometers detecting a specific motion/ movement). The virtual wave is able to display designs that another user is able to see from a distance, e.g., spiral design. In some embodiments, the wave is also sent to another device. In some embodiments, the wave or handshakes include varying levels of fees/costs. For example, a wave is able to be free for up to 10 seconds, but there is a fee for a wave lasting longer than 10 seconds.

In some embodiments, a handshake or wave is able to be sent by a first user to a second user but then not shared by the second user. In some embodiments, the handshake or wave is accessible via a link, and the link is specially coded so it works one time on a single person's device. This will motivate the person receiving the link to not share it because it works only once.

Devices are able to find nearby users to perform a touchless handshake. For example, devices are able to use WiFi, Near Field Communications (NFC), Bluetooth, low energy Bluetooth, GPS, RFID, or any other implementation to locate other devices within a specified range (e.g., 20 feet). In some embodiments, social networking is utilized to determine which devices are available for the handshake. For example, although five devices may be within the specified distance for sending a handshake, only one of the devices is owned by a contact of the user, so that device is highlighted or selected automatically to receive the handshake or handshake request.

In some embodiments, an ultrasonic implementation or other audio implementation is utilized for the detection of and/or communication with other devices. The sound is unrecognizable to the human ear. Machine learning is able to be used to better recognize the sound. In some embodiments, the knowledge base is used in the app code, but not in the app. Distinctive sounds are able to be utilized for different features/feedback such as an entrance/welcome sound, exit/goodbye sound, and so on. Depending on the implementation, the detectable sound is able to be modified by the user or on the backend.

In some embodiments, a QR code or other recognizable symbol is able to be used to initiate a handshake. The QR code is detected from a distance, and then a handshake is sent between the devices.

In some embodiments, a group handshake is implemented. The group handshake enables performing multiple handshakes at a time. A user is able to select multiple users to send a single handshake, or the user is able to select different handshakes to send to the multiple users.

In some embodiments, contact information (e.g., phone number, email address, social networking information) is exchanged during a handshake. For example, in addition to performing a vibration implementation, contact information for each of the users involved in the handshake is exchanged with the other user or users.

In some embodiments, a video or image is displayed on the mobile device before, during or after the handshake. For example, a video or animated GIF displaying a handshaking hand is displayed on the device such that if the user holds the device with the screen facing away from the user's palm, then the user will see a hand to better replicate a handshake.

In some embodiments, a user is able to generate an event for other users to sign up to shake hands. In addition to exchanging contact information, website links, product information and/or any other information is able to be exchanged.

In some embodiments, a user is able to carve out or block another user from receiving a handshake or aspects of a handshake. For example, a user may not want to share her contact information when performing a handshake, so the user sets privacy settings to block/prevent sharing specific information when performing a handshake. In some embodiments, the user is able to designate classifications of sharing information. For example, if the person on the other end of the handshake is a contact or a contact of a contact based on social networking, the user's email address is able to be shared, but for people the user has no social networking connections with, no personal information is shared.

In some embodiments, in addition to handshakes, other personal greetings are able to be implemented such as a hug, a kiss, a fit bump, and others. Each of the greetings is able to have specific characteristics such as certain sounds, visual implementations, and/or other characteristics.

Wearable devices such a bracelets, necklaces, watches or an attachment to a phone such as a "tile" are able to make a connection of a handshake and/or exchange information.

In some embodiments, the user is able to generate a visual/audible "greeting" message in the app such as by using custom ringtones and sound recognition thereof.

User feedback is able to include analytics that give the app owner feedback on how many handshakes the user has initiated and/or received.

Any type of sharing is able to be implemented such as sharing the application, sharing waves, and/or any other information.

In some embodiments, advertising is included/implemented with the handshake application. For example, before or after a user receives a handshake, an advertisement is presented to the user. In another example, before or after the user generates or sends a handshake, an advertisement is presented to the user. Similarly, any other application (e.g., a wave application) is able to include advertisements.

In some embodiments, users are able to purchase various clipart such as logos (e.g., Denver Broncos logo) to include with the handshake. The purchase is able to take place in the app or via a marketplace. The marketplace is also able to be used to sell waves and commission designers to make and sell the waves.

In some embodiments, a backend system is able to push designs to users. The backend system is also able to push notifications and updates to users.

In some embodiments, pre-set designs are able to be utilized for handshakes and/or waves. The pre-set designs are able to be categorized. An exemplary category is "celebrate" which includes Christmas, Hanukkah, St. Patrick's day, Happy Birthday, and others.

In an exemplary implementation of the wave app, a user opens an app, and the app is in listening mode. The user waves the phone to another user who also has the app. The other user's phone has the app open in the background or opens the app to receive the wave.

In an exemplary implementation of the handshake app, a user shakes a mobile device, and the mobile device detects the shaking motion which signals the app to deploy a distinctive sound. When the sound is deployed, the other user's mobile device vibrates to signal a handshake, and at the same time, the other user's app deploys the same sound or a different sound. The other mobile device (e.g., the first user's mobile device) generates a vibration to signal the handshake. After a handshake, each user is able to receive an alert. The alert is able to include any type of information.

In another exemplary implementation, a user taps a logo of an app, the app goes into a "wiggle" mode. After the user shakes the device, the user receives feedback on the number of shakes that were consummated.

In some embodiments, the mobile device waits for the user to have the phone in theft hand before vibrating, since it is not really a handshake if the device is in the user's pocket.

The process is able to take place in milliseconds, microseconds or nanoseconds, depending on the implementation.

FIG. 1 shows an exemplary screenshot indicating the number of handshakes that have been consummated according to some embodiments. After a user sends a handshake to another user, the user's device eventually receives an acknowledgment that the handshake was received and/or a responding handshake was received. The acknowledgment and/or response are recorded and tracked.

Figure 2:
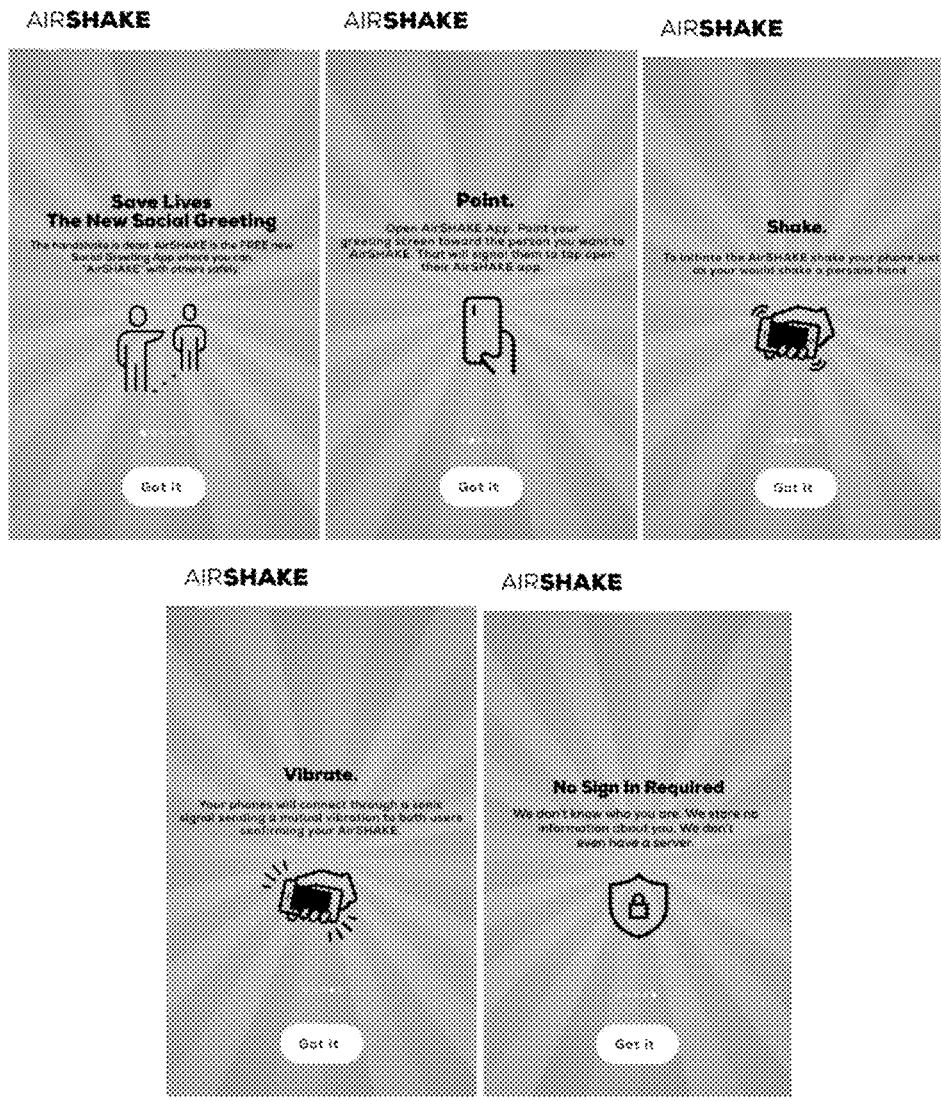
FIG. 2 shows exemplary screenshots of welcome screens of the handshake app according to some embodiments.

FIG. 2 shows exemplary screenshots of welcome screens of the handshake app according to some embodiments. As shown in the screenshots, in some implementations, a user points a greeting screen toward a person to send a touchless handshake, which signals the other user to open her handshake app. The users then shake their respective devices similar to a handshake (or any other type of motion). The devices will connect wirelessly (e.g., via a sonic or ultrasonic signal) and send a mutual vibration to both users confirming the touchless handshake. In some embodiments, user information is kept secret via privacy structures such that $3^{rd}$ parties do not receive private information.

In some embodiments, there are non-paid users and paid users. For example, a free version implements a 10 second delay or handshakes or waves are limited to 10 seconds. Other limitations are able to be implemented for a free version.

Figure 3:
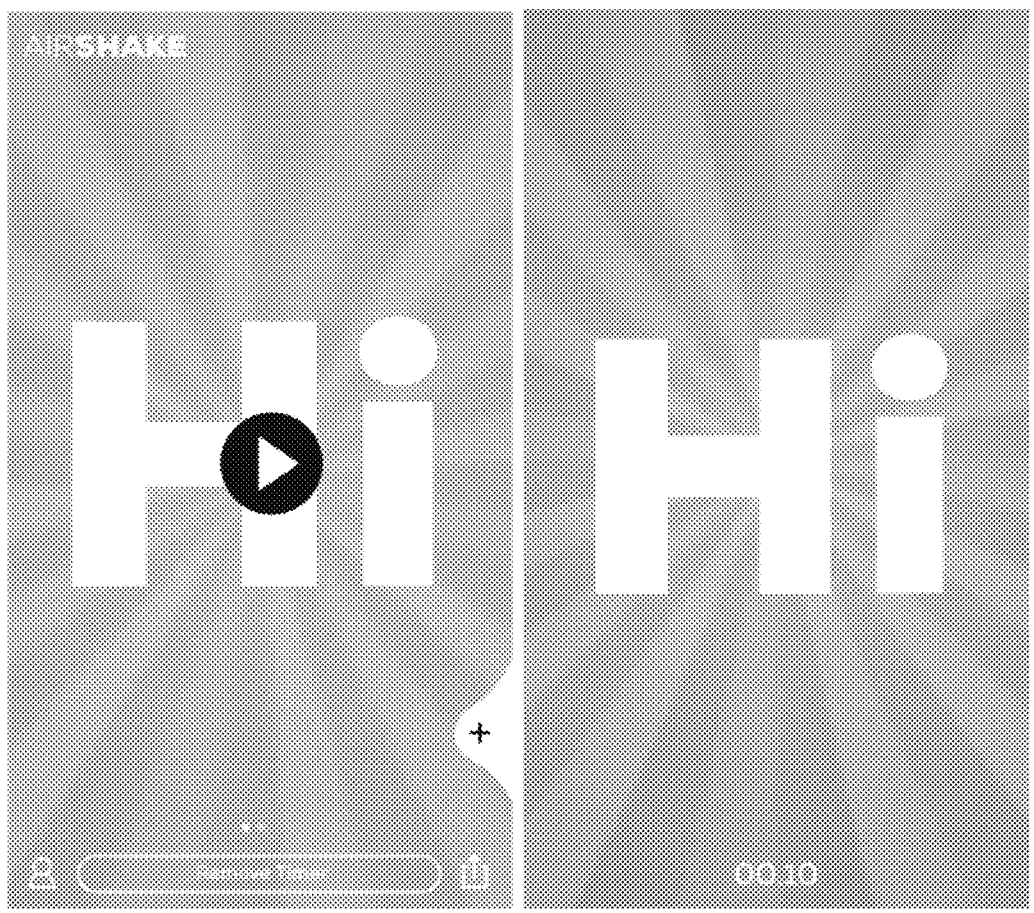
FIG. 3 shows an exemplary screenshot of a home frame/screen according to some embodiments.

FIG. 3 shows an exemplary screenshot of a home frame screen according to some embodiments. The solid tab "plus" icon at the lower right is used to the Generate a new handshake or wave flow. A profile button on the bottom left transitions to a user's profile. A share button on the bottom right invites contacts, sends a wave to contacts and shares the app. A user is able to remove the timer by paying a fee or performing another action.

Figure 4:
FIG. 4 shows an exemplary screenshot of additional frames/screens according to some embodiments.

FIG. 4 shows an exemplary screenshot of additional frames screens according to some embodiments. For example, generate a handshake or wave with "save" is able to be in the upper right. The tab to return home is able to be in the lower left. In another example, a back arrow at the top left is able to be used. The user input is able to be configured in any manner for a user to navigate the different options, menus, and/or features.

Figure 5:
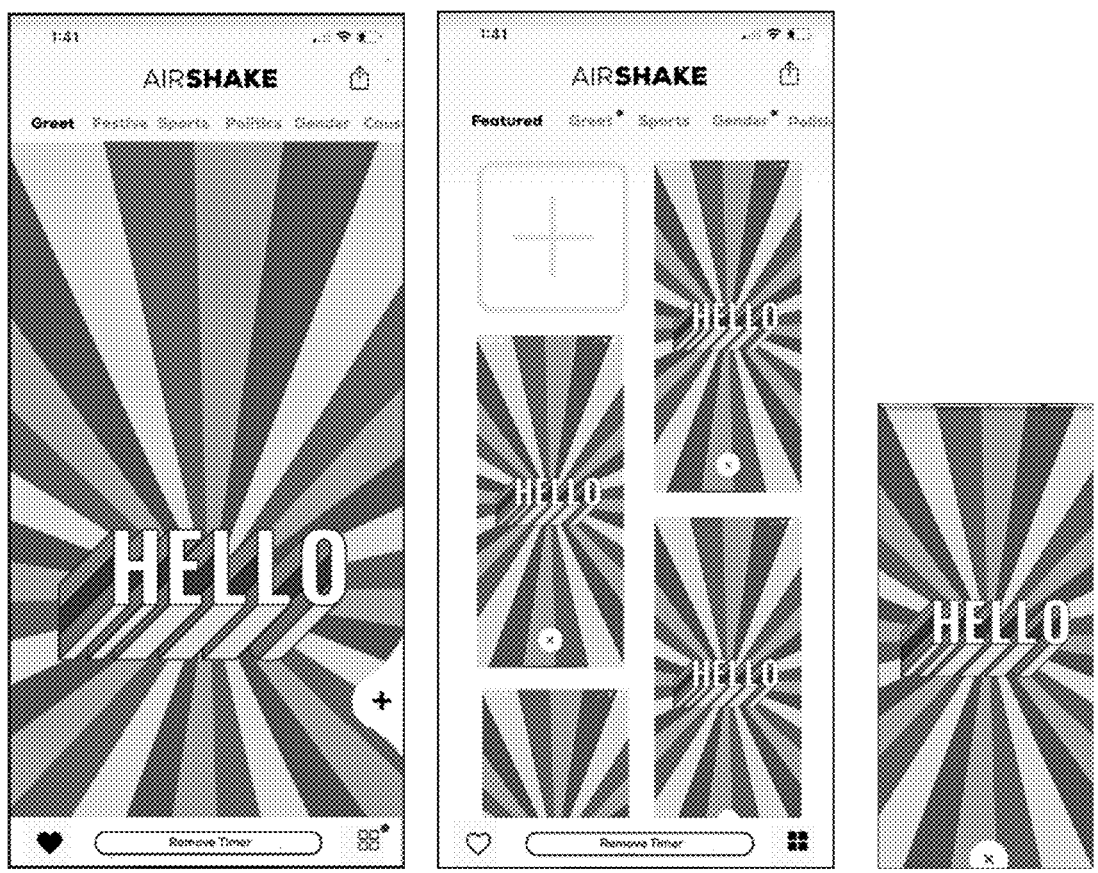
FIG. 5 shows exemplary alternative screenshots of a home frame/screen according to some embodiments.

FIG. 5 shows exemplary alternative screenshots of a home frame/screen according to some embodiments.

In some embodiments, a view mode has auto play. As described herein, for the non-paid user, there is timer. The timer is able to act like a watermark so the user wants to remove it. Also people wave their "wave" toward others so the user might want to remove the watermark if it is very visible. Instead of numbers counting down, the numbers are able to shrink.

Figure 6:
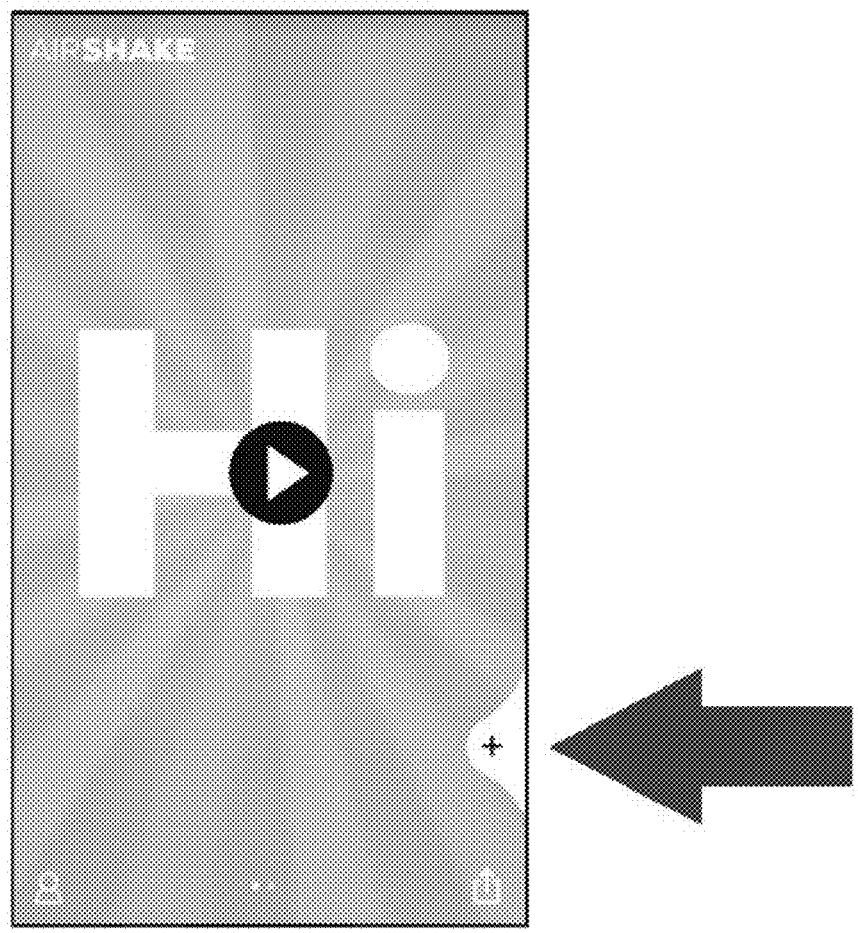
FIG. 6 shows an exemplary screenshot for generating a wave according to some embodiments.

FIG. 6 shows an exemplary screenshot for generating a wave according to some embodiments. The user adds a color by selecting the Plus Circle icon, and that adds a color on the Spin Pin. Then, the user selects the color Circle Dot and the Color Scrub comes up and covers the upper tools. This makes for a clean view while selecting color.

The color dot the user selects will have a black circle around it. The inner circle is slightly smaller to see white around the color. The user selects a down arrow to collapse the color scrub. The user is able to perform a long press on a color dot to rearrange colors. Crop is grayed out when there is no image on the canvas.

Figure 7:
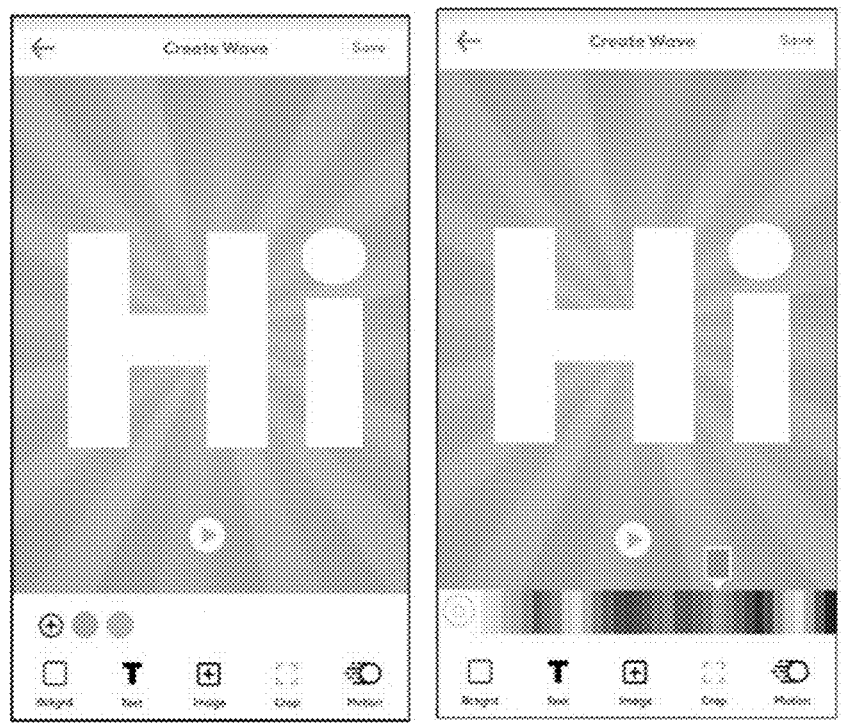
FIG. 7 shows exemplary screenshots of the color editor according to some embodiments.

FIG. 7 shows exemplary screenshots of the color editor according to some embodiments. The left screenshot is without the color dropper, and the right screenshot is with the color dropper. The Plus mark with the white circle background on the color dot appears when the user selects the drop icon. The white circle background is important because it calls out to the user that they tap it to apply the color.

Figure 8:
FIG. 8 shows exemplary screenshots of a wave color editor according to some embodiments.

FIG. 8 shows exemplary screenshots of a wave color editor according to some embodiments. In addition to changing the art in the wave, a user is able to change the background, for example, the color or pattern of the background.

Figure 9:
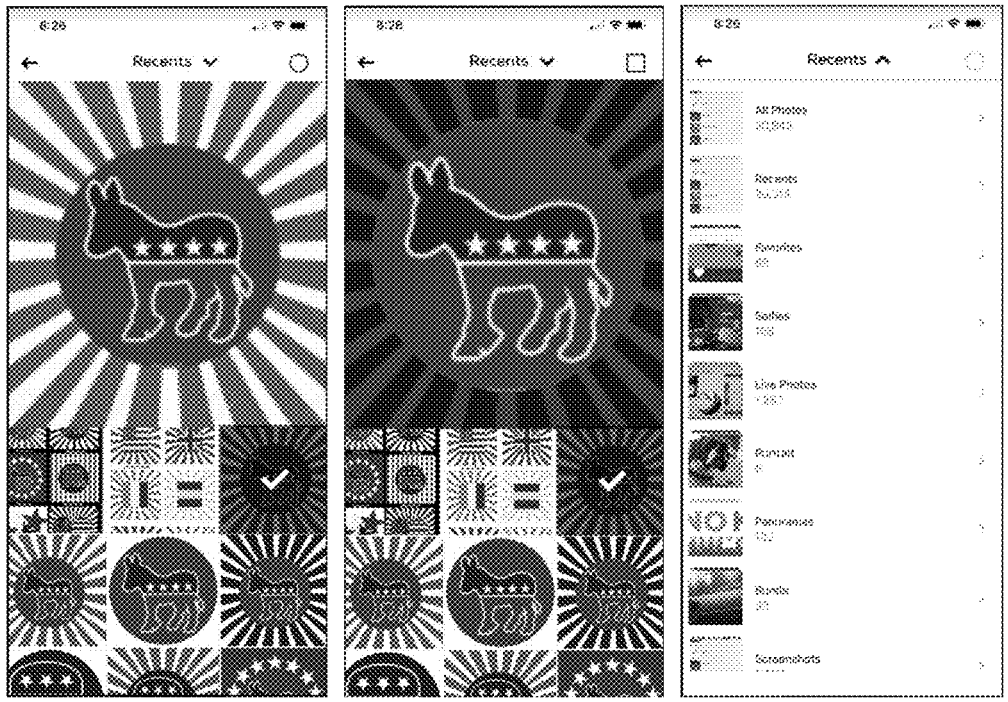
FIG. 9 shows exemplary screenshots for adding an image according to some embodiments.

FIG. 9 shows exemplary screenshots for adding an image according to some embodiments. Additionally, there are crop tools to crop images such as a circle or square crop tool.

When a user selects the image icon after the user already has an image then the current image is viewed in the Add Image Selector, and the user is able to remove it by tapping on the trashcan icon. When the image is removed, the user sees an empty image box or circle and is able to add another image if she chooses.

Figure 10:
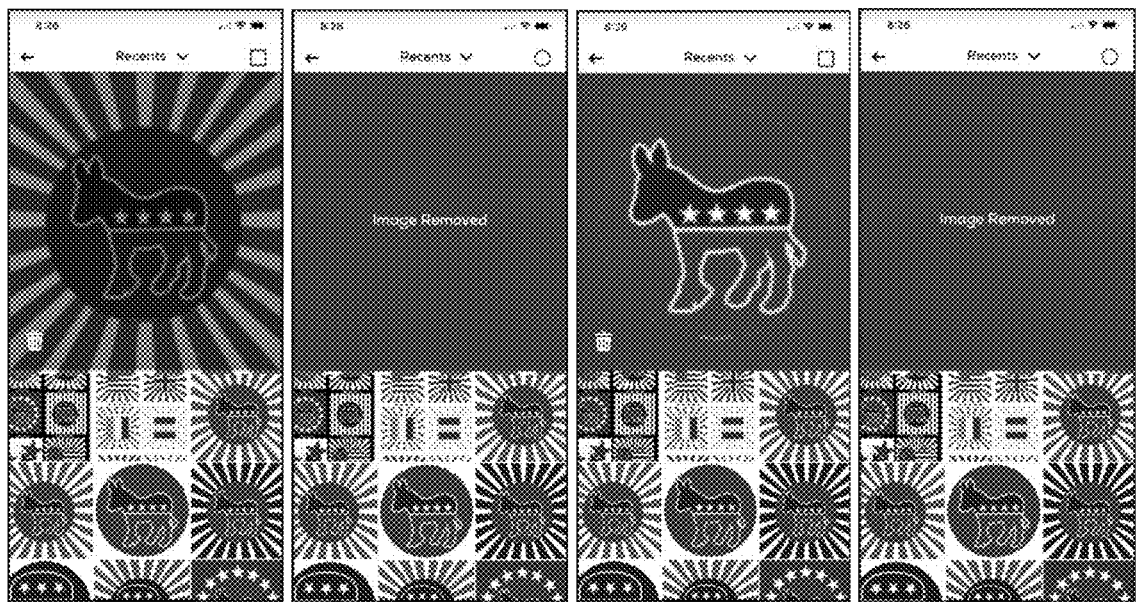
FIG. 10 shows exemplary screenshots for adding/cropping/removing an image according to some embodiments.

FIG. 10 shows exemplary screenshots for adding/cropping/removing an image according to some embodiments. The left image shows a square image. In the center left image, the square image has been removed. The circle crop icon is the default view after the image is removed. In the center right image, a circle image is shown. The right image shows after the circle image has been removed.

The app is able to include a motion tool. There are two types of motion: Spin and Color Flash (Flash). Spin causes a spinning motion. Flash is when the element is coded to flash the color spectrum with the Wave movement.

Figure 11:
FIG. 11 shows exemplary screenshots of applying motion to a wave according to some embodiments.

FIG. 11 shows exemplary screenshots of applying motion to a wave according to some embodiments. The left image shows the user is in Spin mode and is able to apply spin motion to the selected layer. In Spin mode, there could be up to 3 chubby thumbnails: Background, Image or Text. In Flash mode, there are only up to 2 chubby thumbnails: Text or Image PNG (clear background). Although 2 and 3 thumbnails are described herein, other numbers of thumbnails are able to be utilized.

In the middle image, the user is in Flash mode. Only Text and Clear transparency image are viewable in Flash mode. This example shows just text viewable.

In the right image, there is an example in Flash mode with both Text and an Image PNG (clear background) for the user to apply Apple Flash on their selection.

The page layout is able to be any layout. For example the text/links are able to be text or images and are able to be placed in any location.

In some embodiments, users are able to add images as a layer on top of a pinwheel or solid background.

The app is able to include a background tool. When a user transitions from a spiral background to a solid background there are no color dots. The user sees the color scrub. In some embodiments, a default includes a solid background with color Flash word of "Hello."

Figure 12:
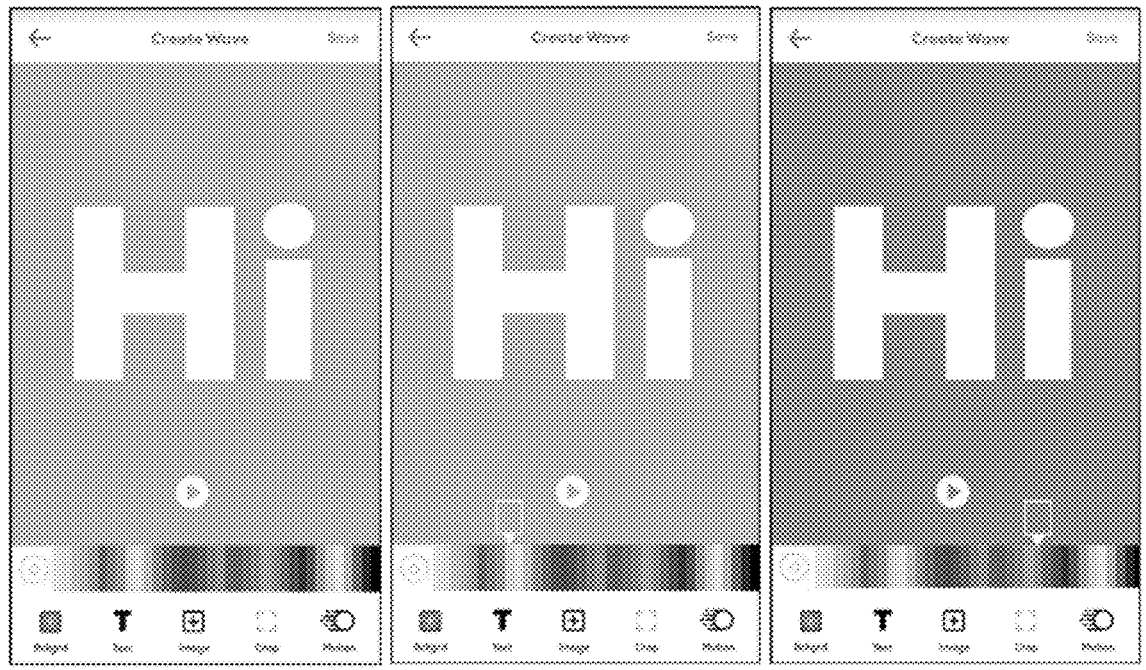
FIG. 12 shows exemplary screenshots of changing colors according to some embodiments.

FIG. 12 shows exemplary screenshots of changing colors according to some embodiments. The left image shows an example of a transition where the first spiral color is shown as a solid background. The middle image shows an example that when a user touches the color scrub, the color window appears. The right image shows an example that when a user slides her finger on the color scrub, the color window and the background (or pin of pinwheel in the case of Spin mode)

change to the selected or touched color dynamically as the finger slides across back and forth on color scrub.

The color dropper becomes inactive if there is no image on the canvas.

Figure 13:
FIG. 13 shows an exemplary screenshot of an active color dropper according to some embodiments.

FIG. 13 shows an active Color Dropper according to some embodiments. This is also useful when in Spin mode, and the user wants to match pins. This is also very useful when the image has multiple colors that the user is trying to match color exactly.

The app is able to include a text editor. The minus icon sets the text as a "spinner" or "static." The text in terms of motion is defaulted to the setting the user has in the main editor.

Figure 14:
FIG. 14 shows an exemplary screenshot of a circle implementation according to some embodiments.

The circle icon sets the text as a jumbo billboard. FIG. 14 shows an exemplary screenshot of a circle implementation according to some embodiments.

Figure 15:
FIG. 15 shows an exemplary screenshot showing a color motion (color spectrum circle) and shadow feature according to some embodiments.

FIG. 15 shows an exemplary screenshot showing a color motion (color spectrum circle) and shadow feature according to some embodiments. Any variety of text or image effects are able to be applied.

Figure 16:
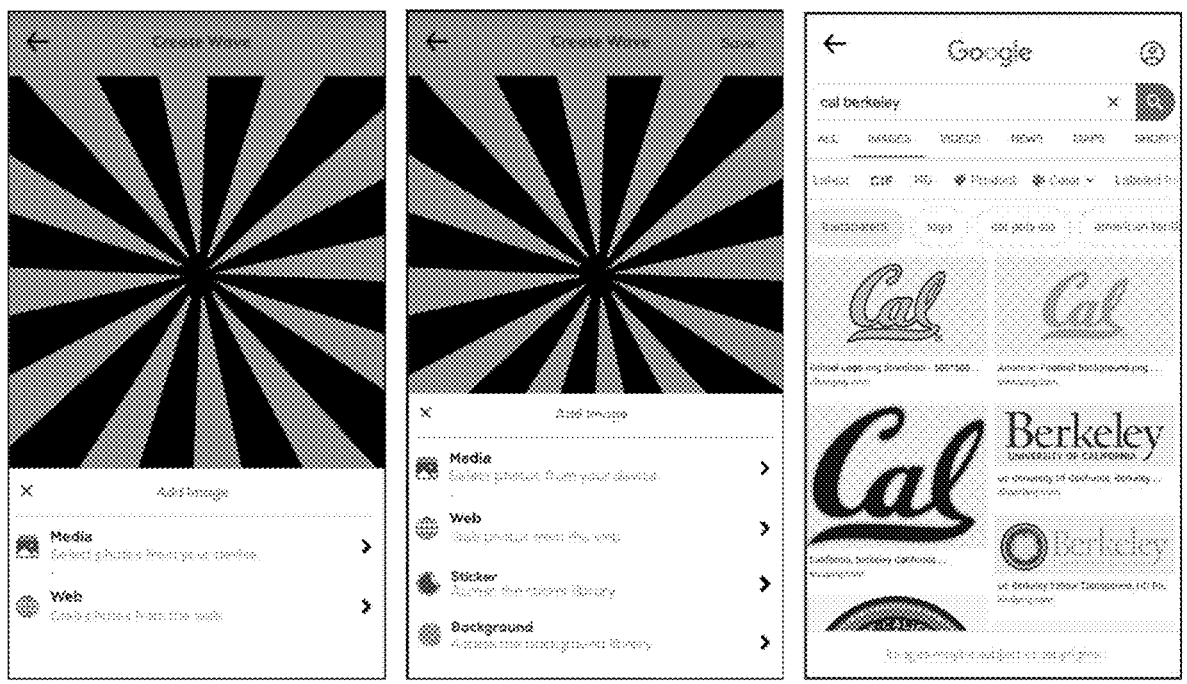
FIG. 16 shows exemplary screenshots for adding an image to an editor of the app according to some embodiments.

FIG. 16 shows exemplary screenshots for adding an image to an editor of the app according to some embodiments. The image is able to be added from the Internet, a local source (e.g., the mobile device's memory storage) or another source.

Figure 17:
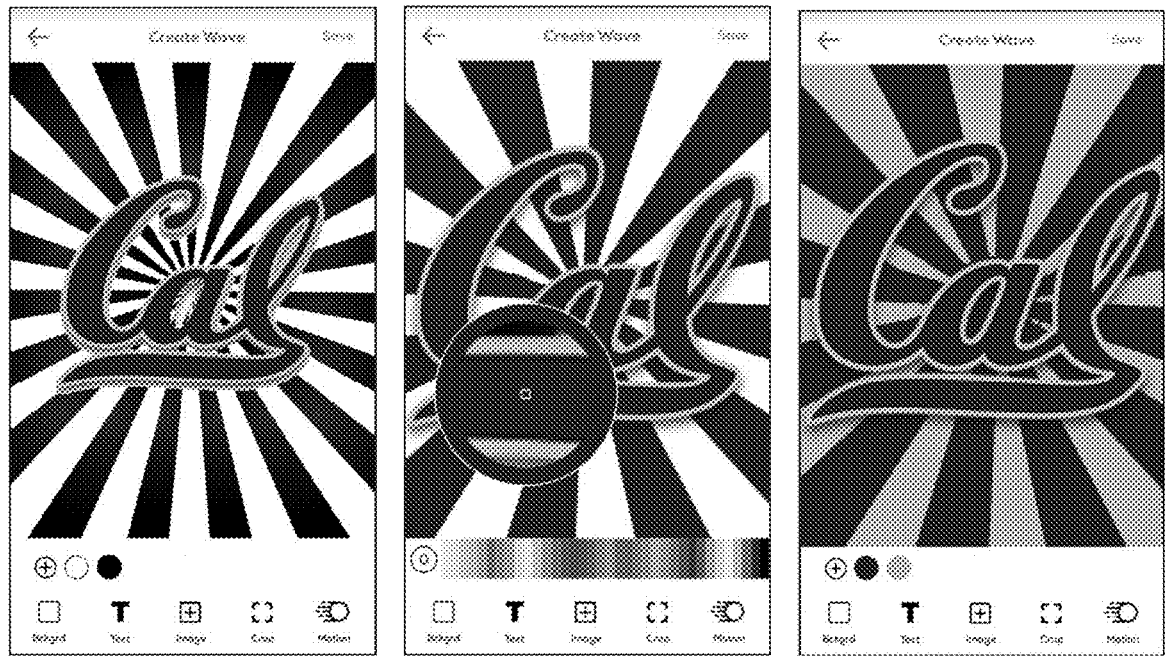
FIG. 17 shows exemplary screenshots of utilizing a color dropper according to some embodiments.

FIG. 17 shows exemplary screenshots of utilizing a color dropper according to some embodiments. Unlike the circle crop app, the user does not see the +grey screen. When the user selects the crop button (only active when there is an image in editor) the crop system opens to the square crop shape. The user is able to select the circle icon to toggle to circle crop.

Figure 18:
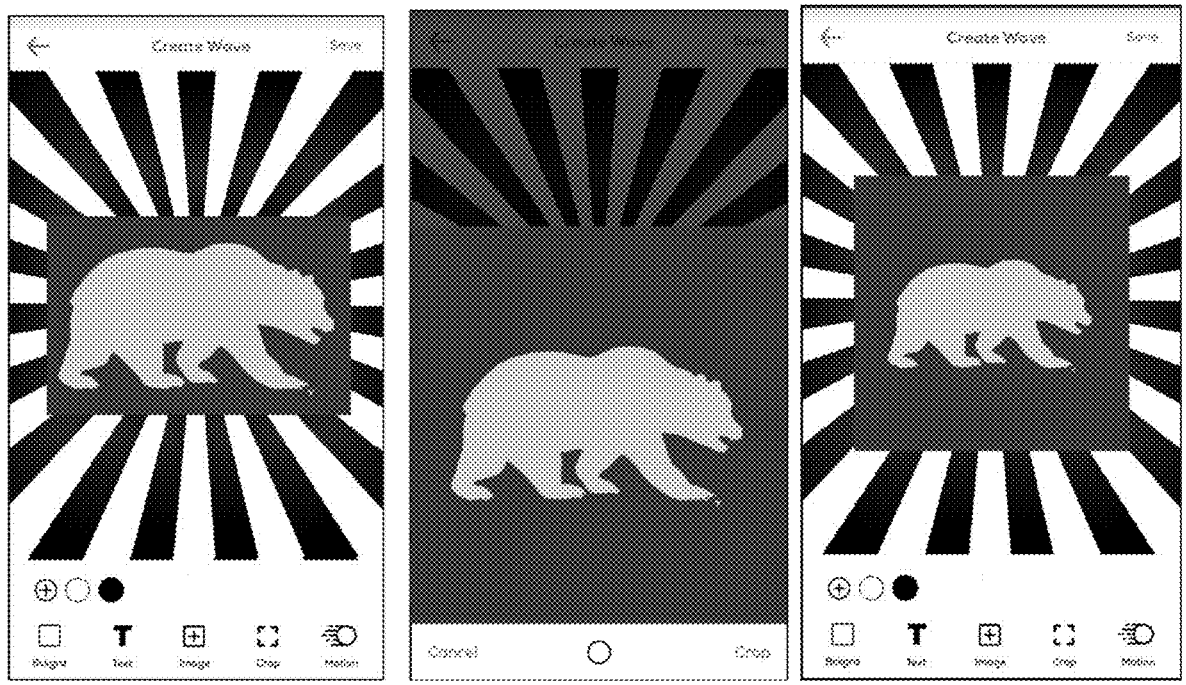
FIG. 18 shows exemplary screenshots of the square crop according to some embodiments.

FIG. 18 shows exemplary screenshots of the square crop according to some embodiments. The left image shows before the image is cropped. The middle image shows the square crop tool. The user is able to toggle to the circle crop mode at the bottom center. The right images shows after the square crop was applied.

Figure 19:
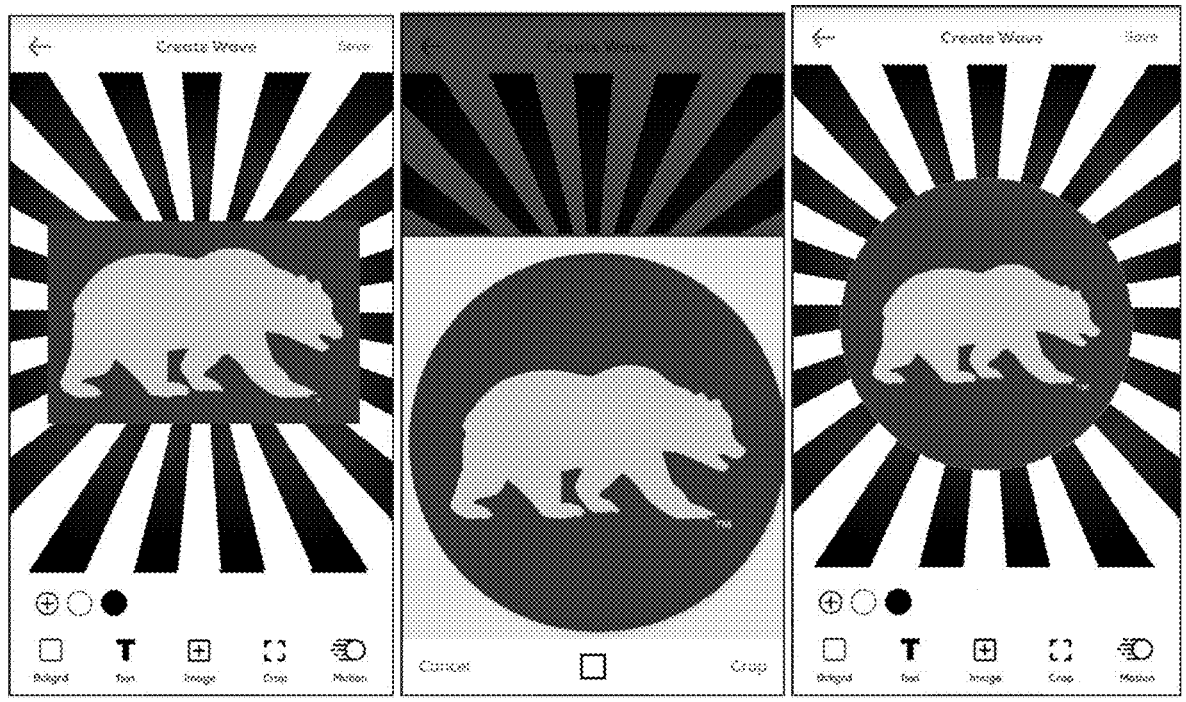
FIG. 19 shows exemplary screenshots of the circle crop according to some embodiments.

FIG. 19 shows exemplary screenshots of the circle crop according to some embodiments. The left image is before the image is cropped. The middle image shows the circle crop tool. The user is able to toggle to the square crop mode at the bottom center. The right images shows after the circle crop was applied.

Figure 20:
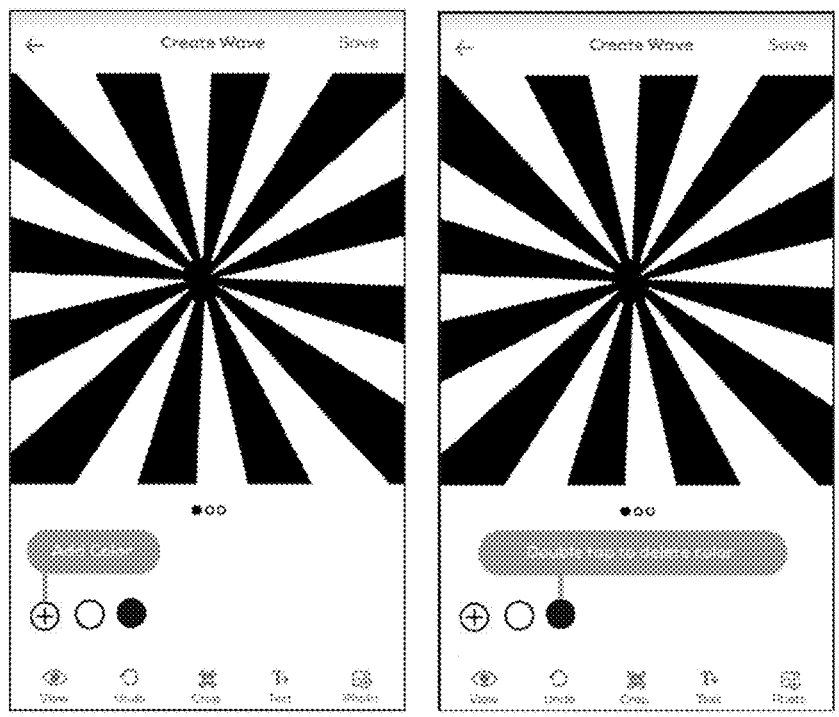
FIGS. 20 and 21 show exemplary screenshots of instruction frames according to some embodiments.
Figure 21:
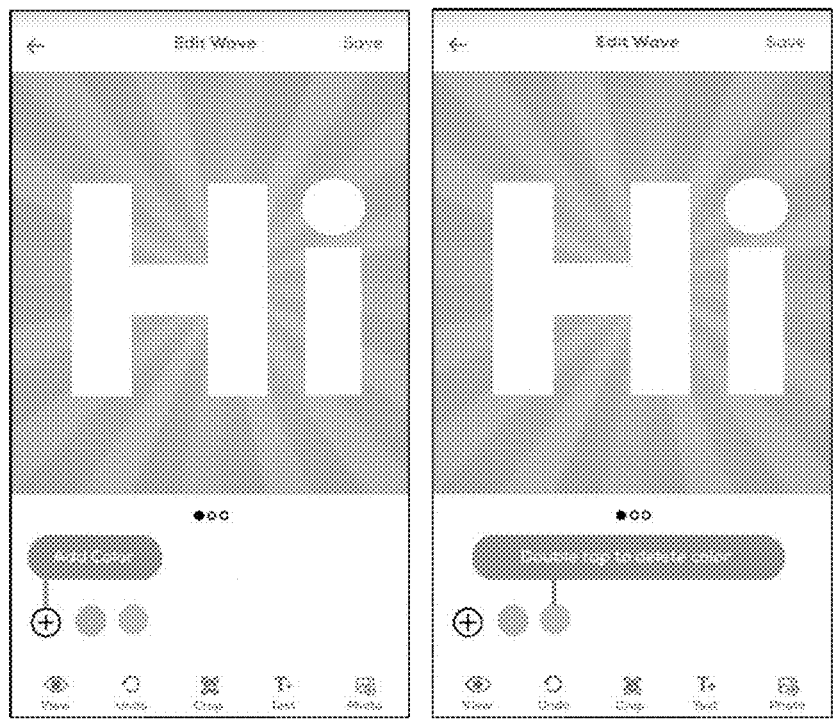

FIGS. 20 and 21 show exemplary screenshots of instruction frames according to some embodiments. The frames are able to be for previously designed waves (e.g., waves being edited) or for a fresh new wave.

Figure 22:
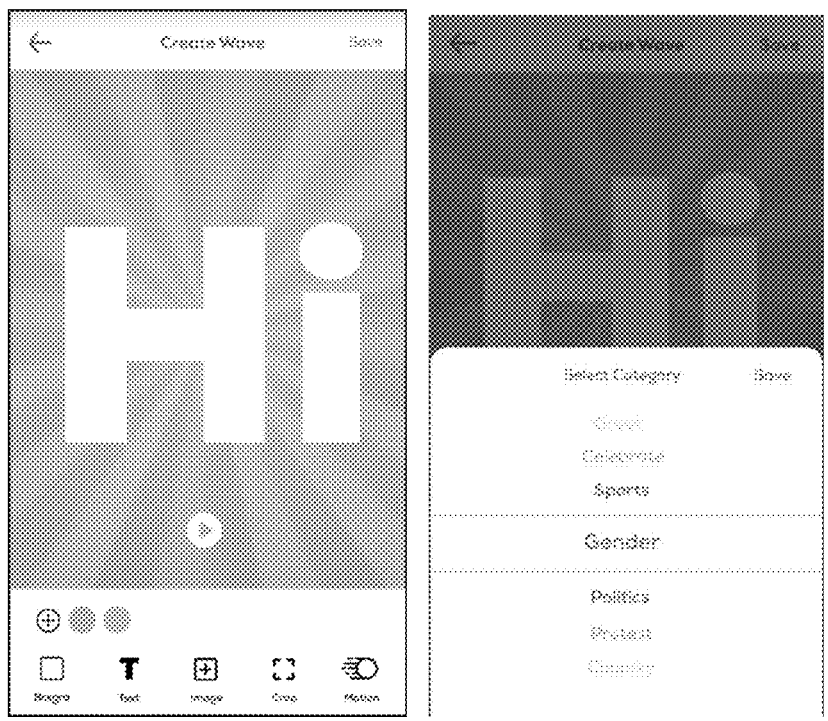
FIG. 22 shows exemplary screenshots of saving a wave to a profile according to some embodiments.
Figure 23:
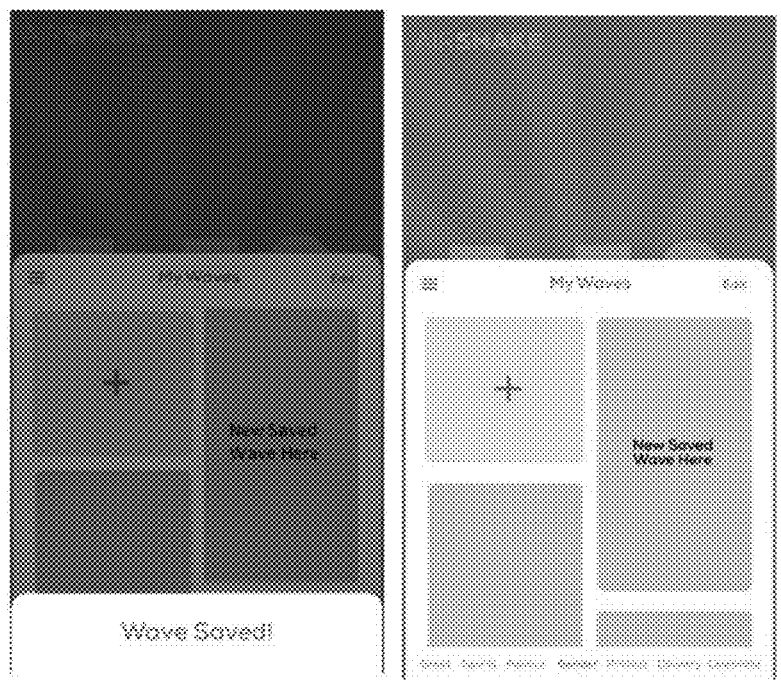
FIGS. 23-29 show exemplary screenshots of saved waves according to some embodiments.
Figure 24:
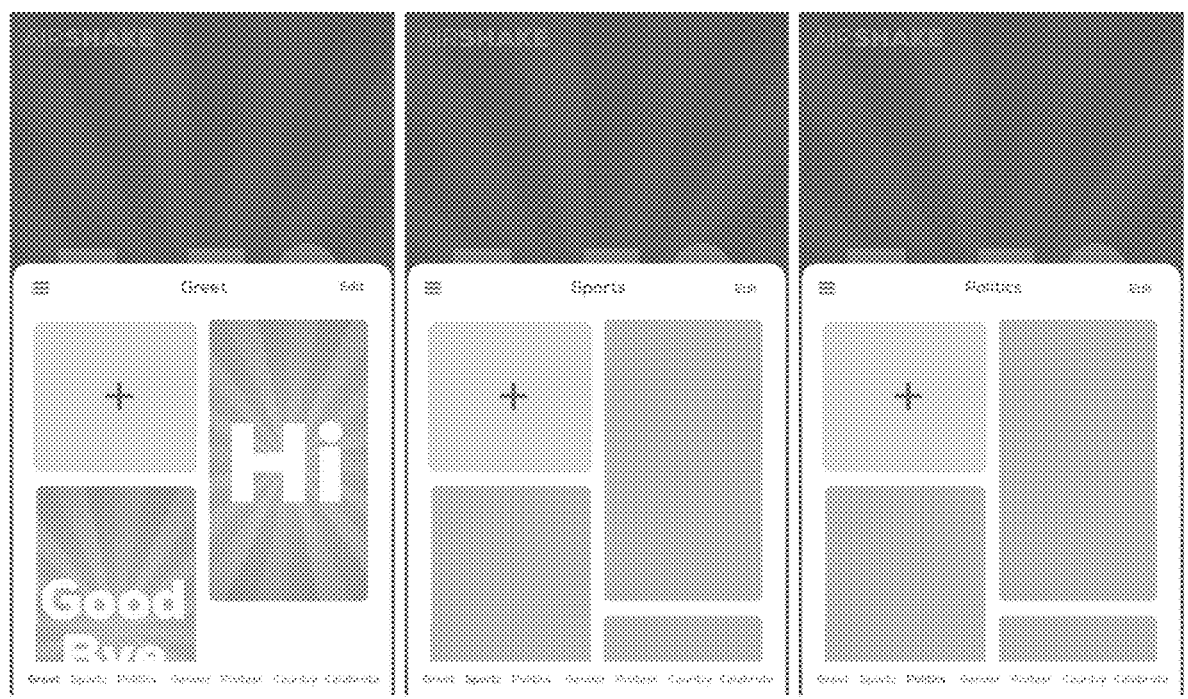
Figure 25:
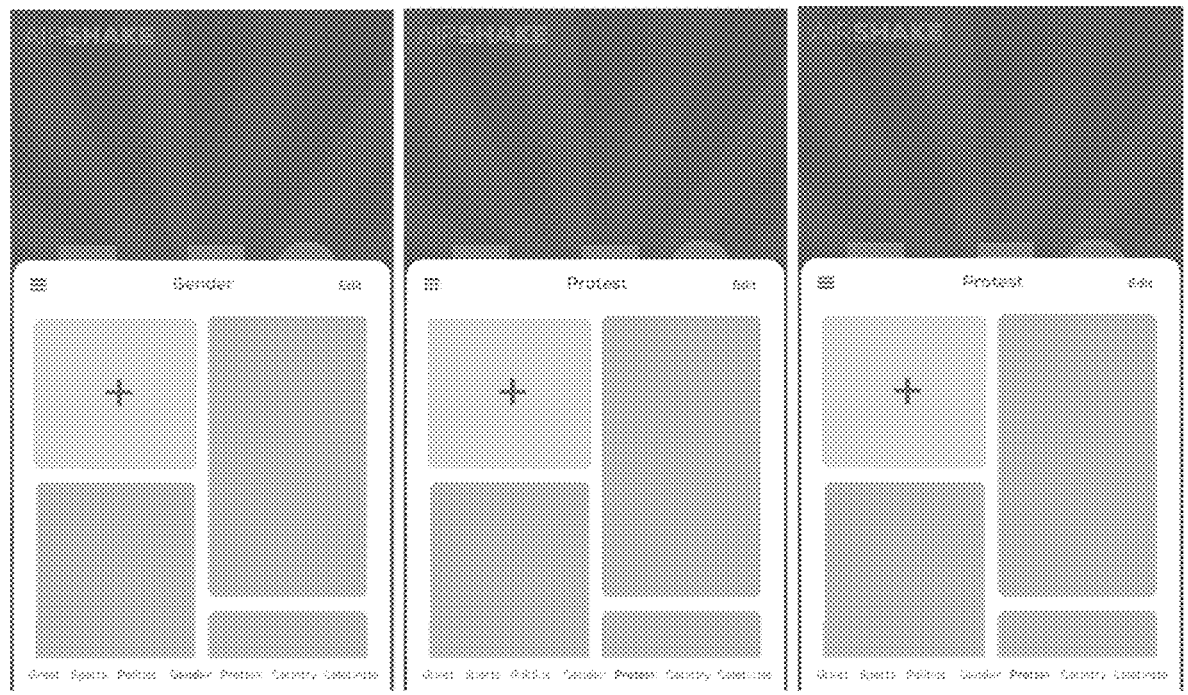
Figure 26:
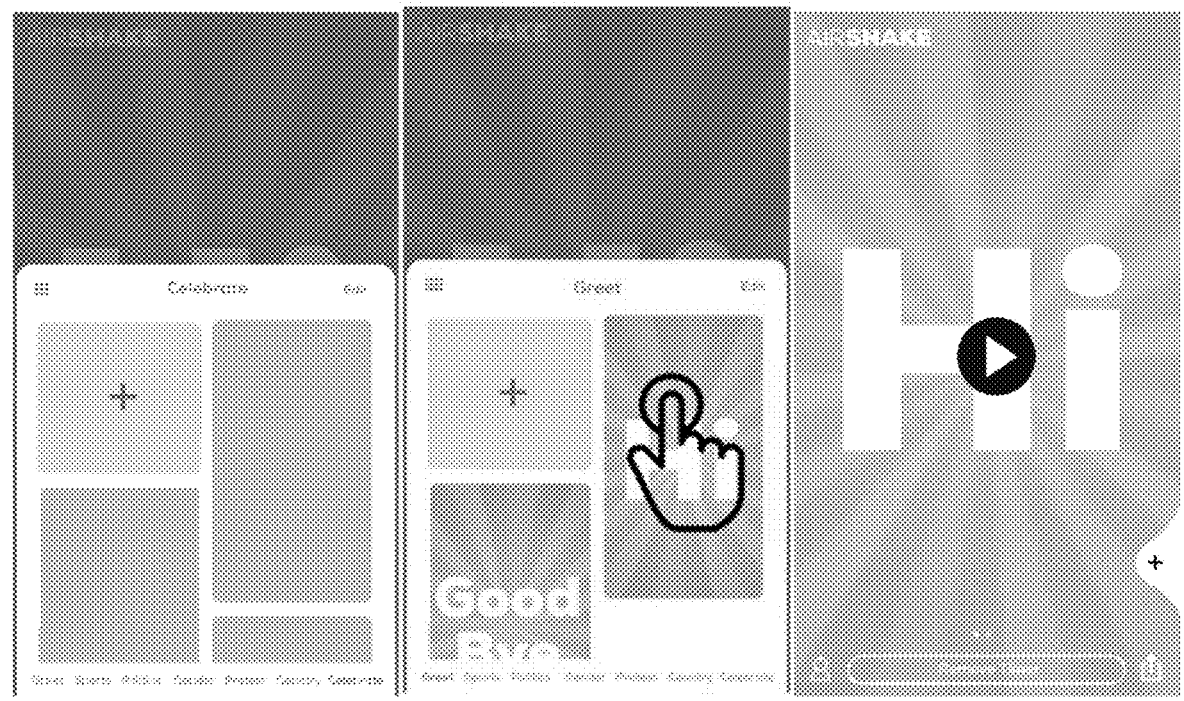
Figure 27:
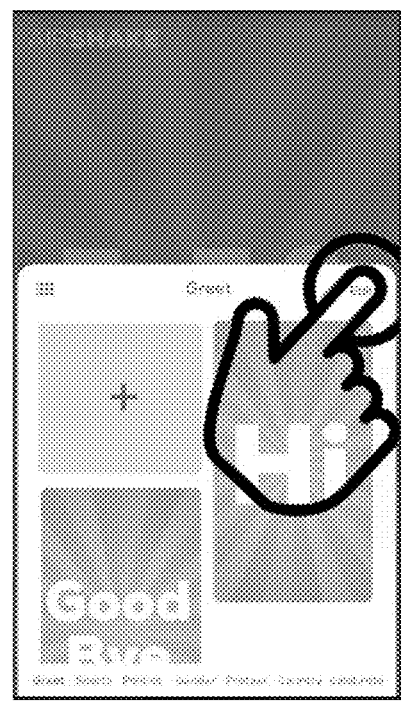
Figure 28:
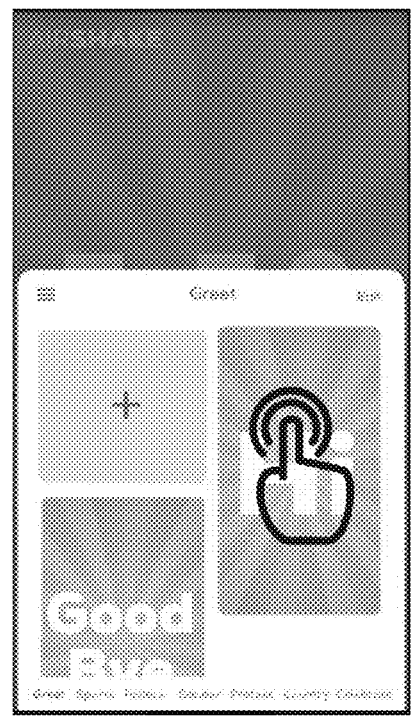
Figure 29:
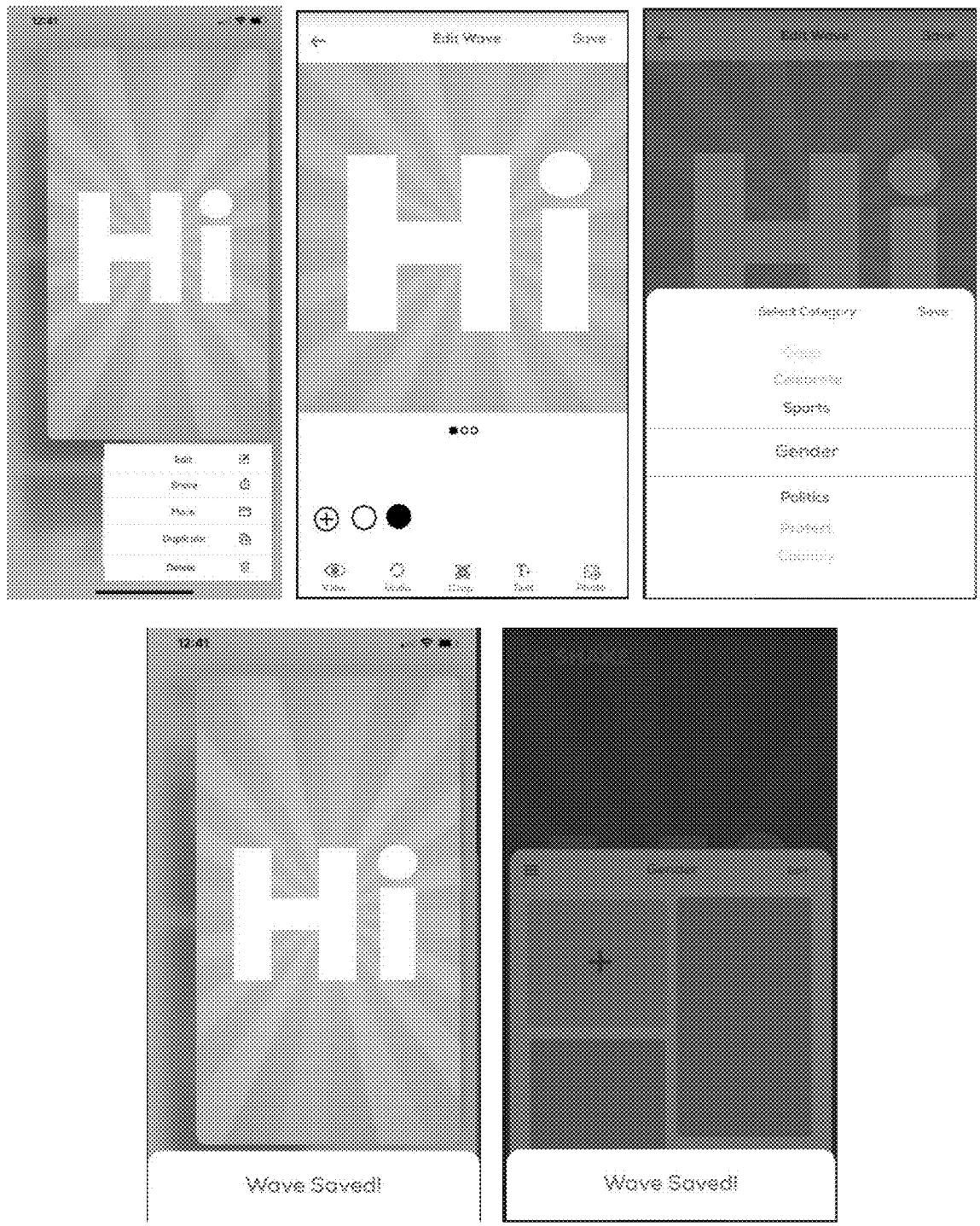

FIG. 22 shows exemplary screenshots of saving a wave to a profile according to some embodiments. The wave is saved to a profile by selecting a category and selecting the save button.

FIGS. 23-29 show exemplary screenshots of saved waves according to some embodiments. In some embodiments, the waves are saved in categories in a profile. If a user selects a wave from these categories, the app simply opens the wave. A user is also able to select "edit" to edit a wave. In the Figures, blank thumbnails are used to hold position, but these are able to be replaced with Pre-Set waves. A long press on a profile wave is able to be used to trigger editing a wave.

Figure 30:
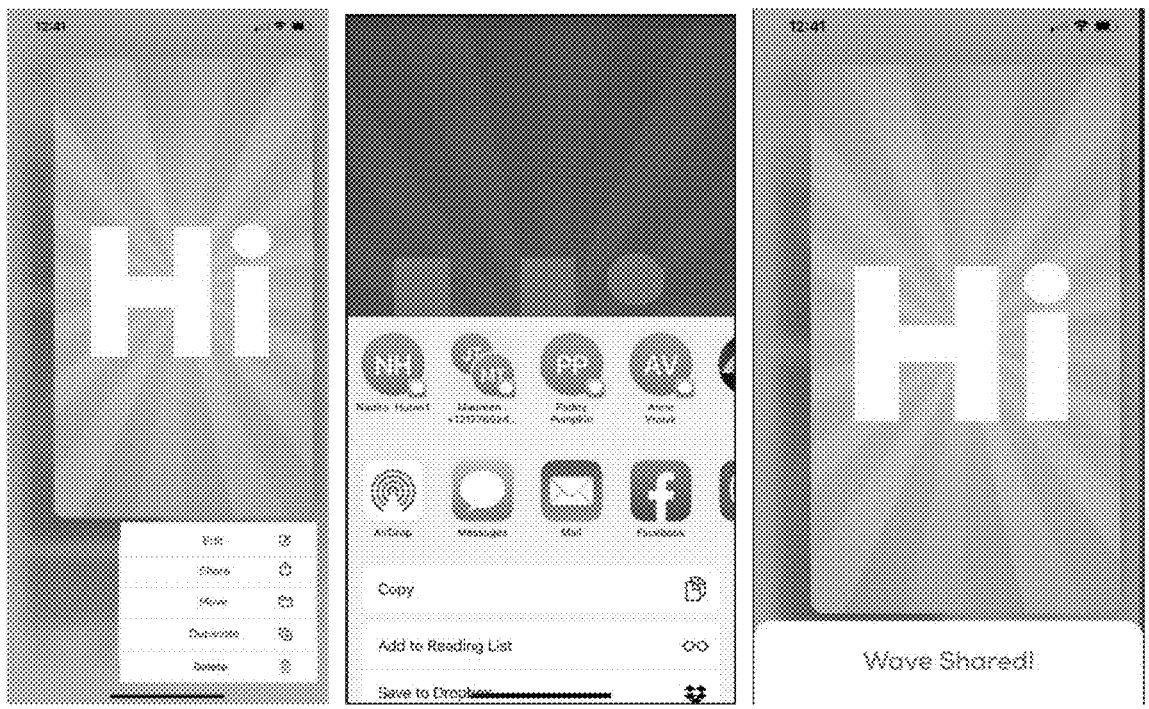
FIG. 30 shows an exemplary screenshot of sharing a wave according to some embodiments.

FIG. 30 shows an exemplary screenshot of sharing a wave according to some embodiments. A wave is able to be shared via any social network, email, messaging or any other implementation.

Figure 31:
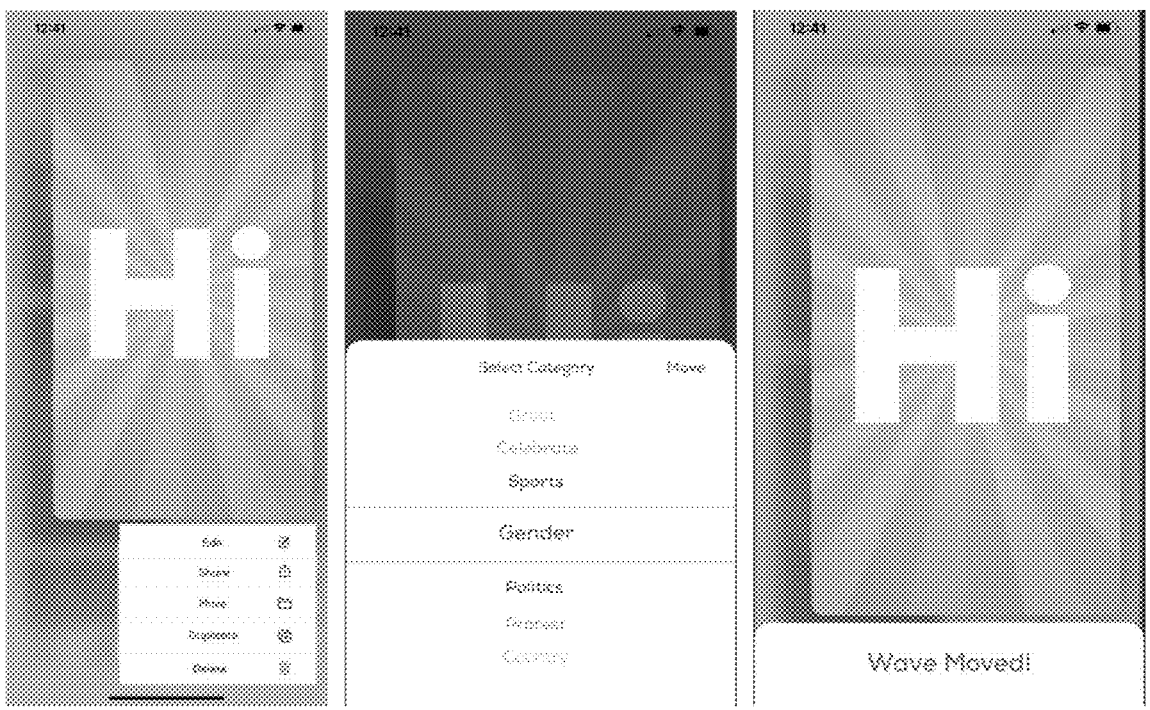
FIG. 31 shows an exemplary screenshot of moving a wave according to some embodiments.

FIG. 31 shows an exemplary screenshot of moving a wave according to some embodiments. The wave is able to be moved from one category to another category.

Figure 32:
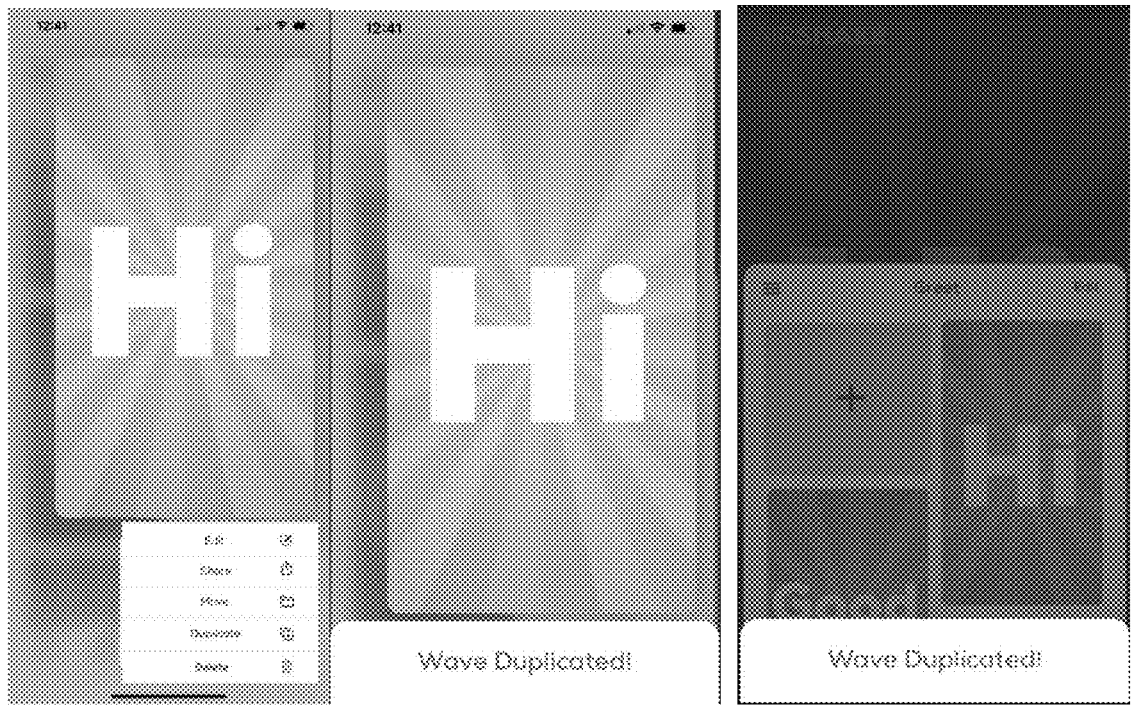
FIG. 32 shows an exemplary screenshot of duplicating a wave according to some embodiments.

FIG. 32 shows an exemplary screenshot of duplicating a wave according to some embodiments. Duplicating a wave enables a user to keep a wave and then modify the duplicated wave.

Figure 33:
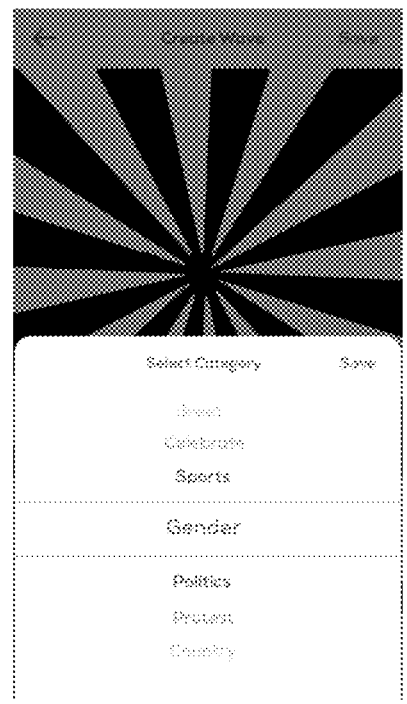
FIG. 33 shows an exemplary screenshot of selecting a category according to some embodiments.

FIG. 33 shows an exemplary screenshot of selecting a category according to some embodiments. Categorizing waves enables users to find their waves faster.

Figure 34:
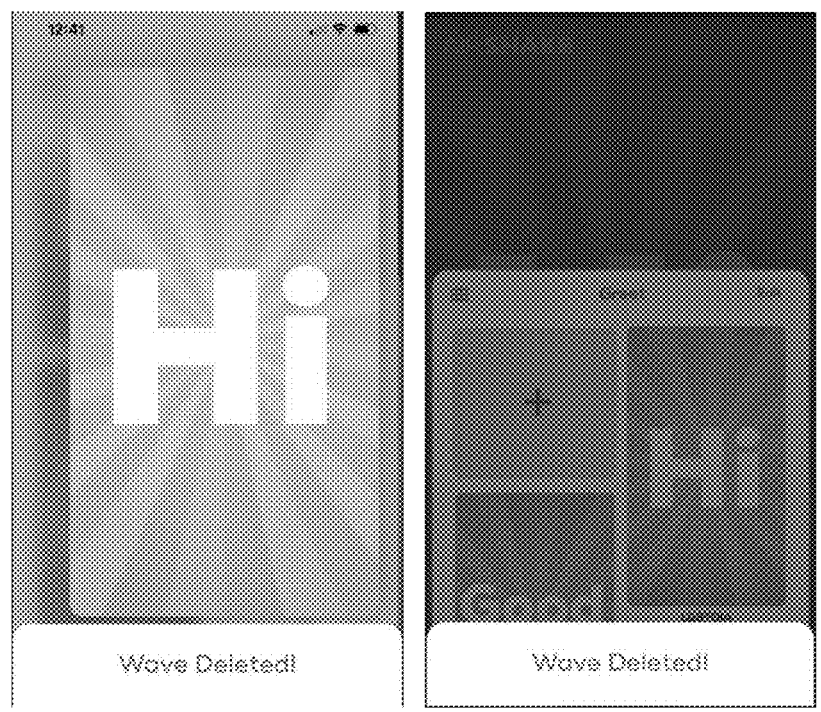
FIG. 34 shows an exemplary screenshot of deleting a wave according to some embodiments.

FIG. 34 shows an exemplary screenshot of deleting a wave according to some embodiments.

Figure 35:
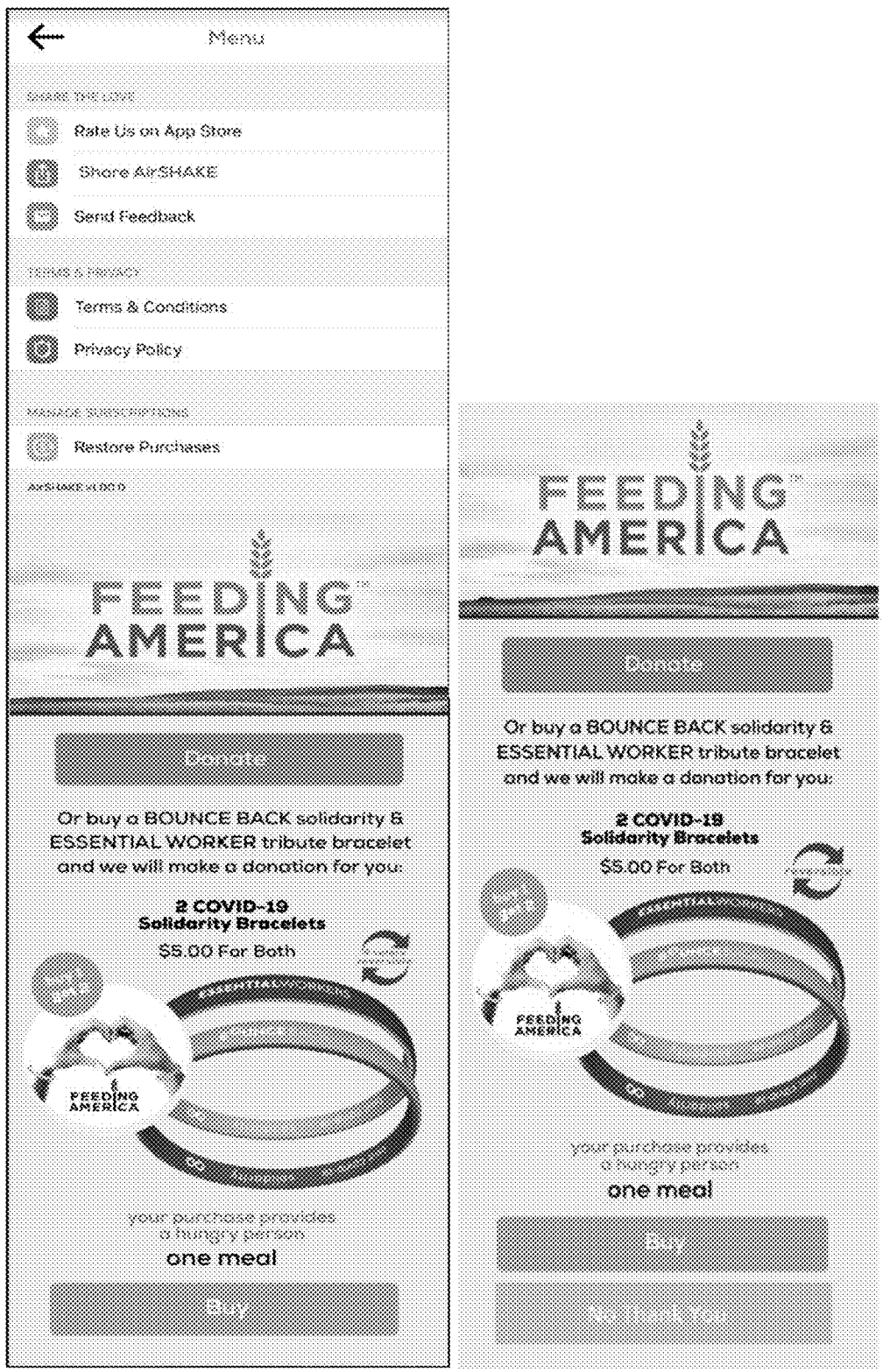
FIG. 35 shows an exemplary screenshot to donate according to some embodiments.

FIG. 35 shows an exemplary screenshot to donate according to some embodiments.

Figure 36:
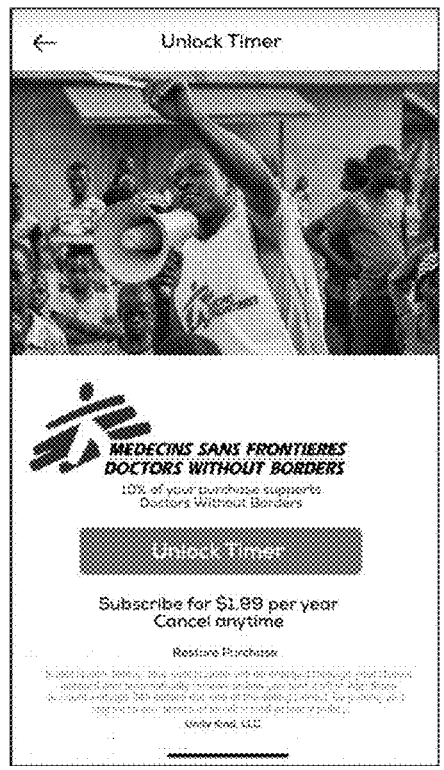
FIG. 36 shows an exemplary screenshot of a timer unlock of a wave according to some embodiments.

FIG. 36 shows an exemplary screenshot of a timer unlock of a wave according to some embodiments. As described herein, a timer is able to be utilized for a free service which is able to be unlocked by paying a fee.

In some embodiments, a pop-up advertisement is able to appear during a wave. Any type of advertisement is able to be included. The advertisement is able to appear before the wave, as part of the wave, as a background of the wave, and/or after the wave.

Figure 37:
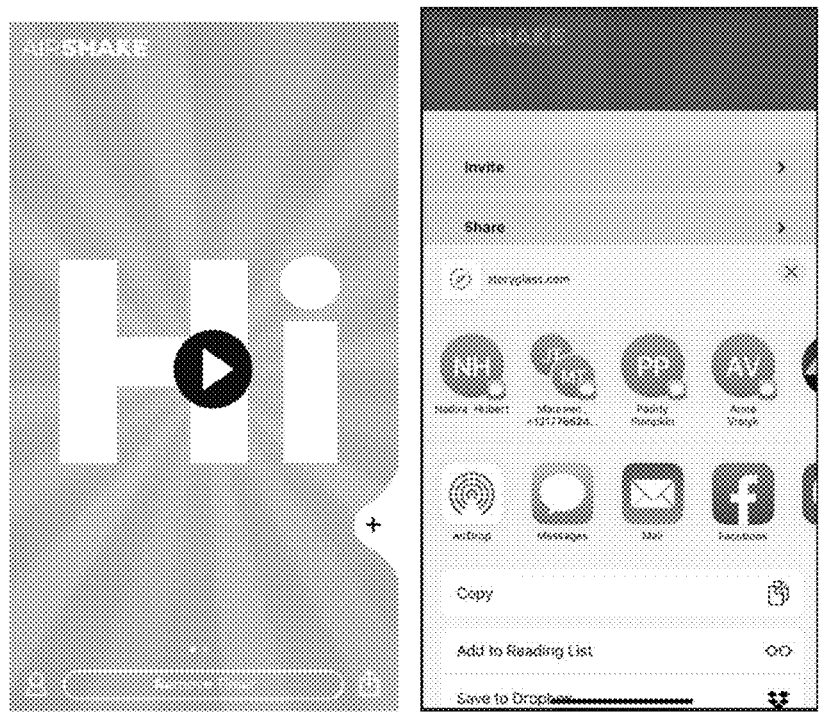
FIG. 37 shows an exemplary screenshot of sharing a wave according to some embodiments.

FIG. 37 shows an exemplary screenshot of sharing a wave according to some embodiments.

Figure 38:
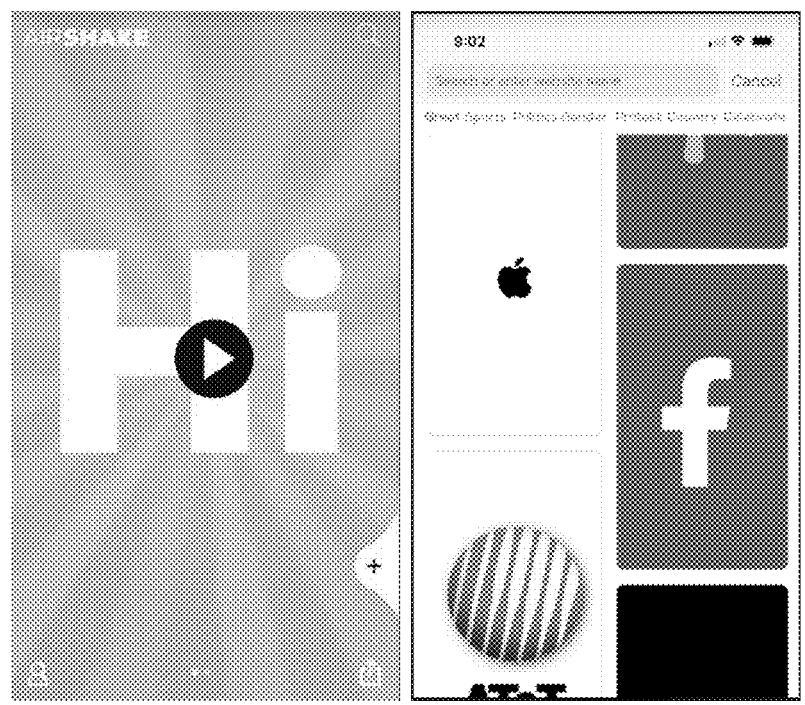
FIG. 38 shows an exemplary screenshot of a search according to some embodiments.

FIG. 38 shows an exemplary screenshot of a search according to some embodiments. The app is able to include a search feature. The search feature is able to be used to search titles of waves, based on a creation date of a wave, using an image search, and/or for text within a wave. Similarly, the app is able to include business logos when providing a wave. By utilizing a company logo, a businessperson is able to indicate where she works. A person's background of the wave is able to be their business card including a logo and contact information.

Figure 39:
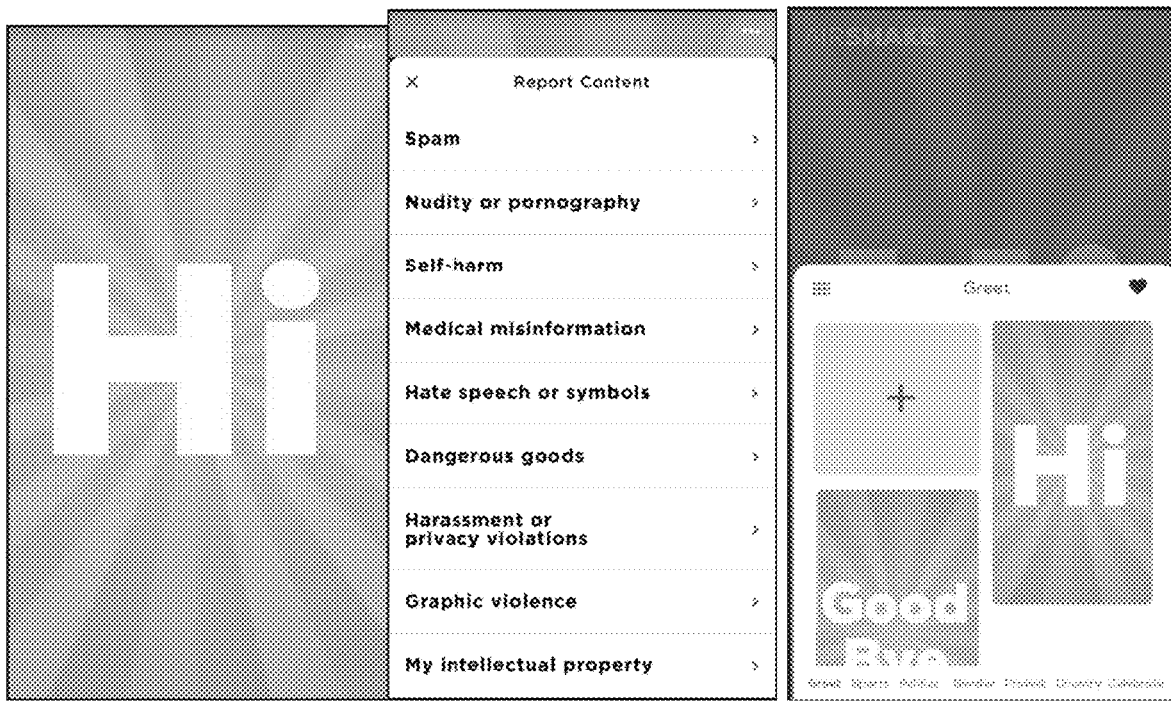
FIG. 39 shows an exemplary screenshot of reporting inappropriate content according to some embodiments.

FIG. 39 shows an exemplary screenshot of reporting inappropriate content according to some embodiments. Any type of content is able to be flagged and reported. Specific categories of inappropriate content are able to be selected and utilized.

Figure 40:
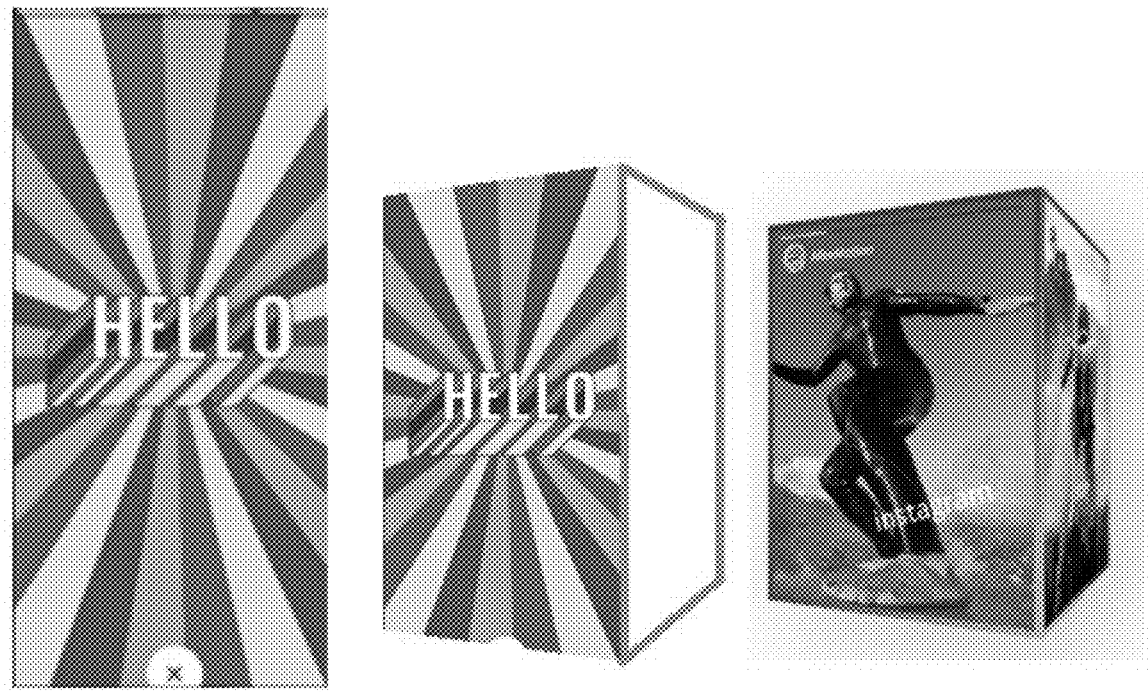
FIG. 40 shows an exemplary screenshot of a 3D implementation according to some embodiments.

FIG. 40 shows an exemplary screenshot of 3D implementation according to some embodiments. A wave or handshake is able to be implemented in a 3D orientation where the text and/or graphics are able to rotate in multiple directions.

Figure 41:
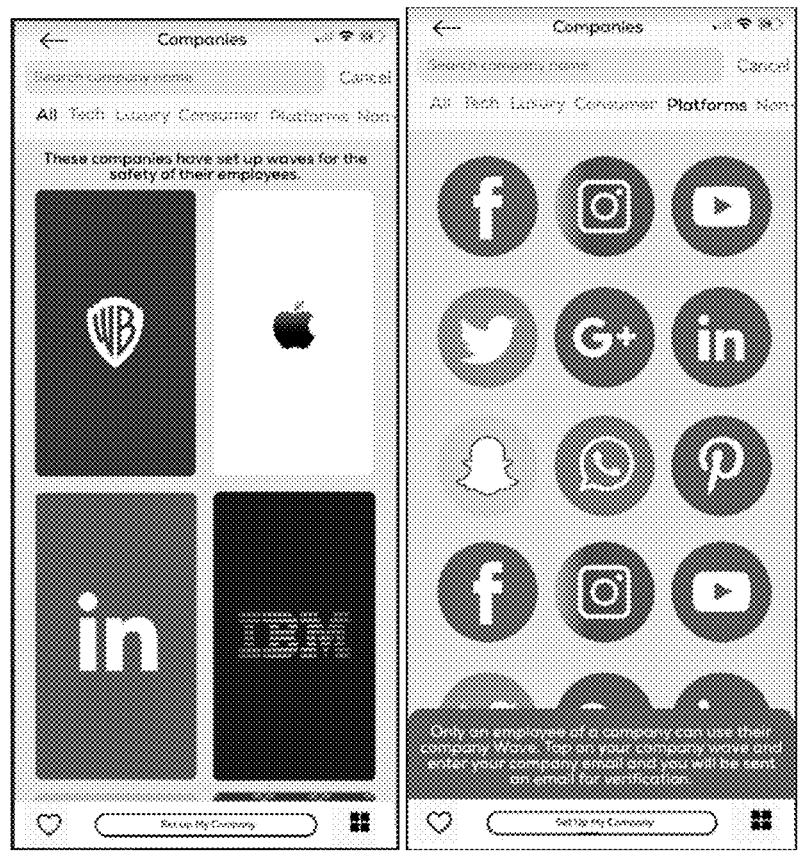
FIG. 41 shows an exemplary screenshot of company logos as waves according to some embodiments.

FIG. 41 shows an exemplary screenshot of company logos as waves according to some embodiments. Companies are able to set up waves for their employees. In some embodiments, only an employee of a company is able to use the company wave. For example, a user is able to tap on a company logo and enter a company email. The user will then receive an email for verification.

Figure 42:
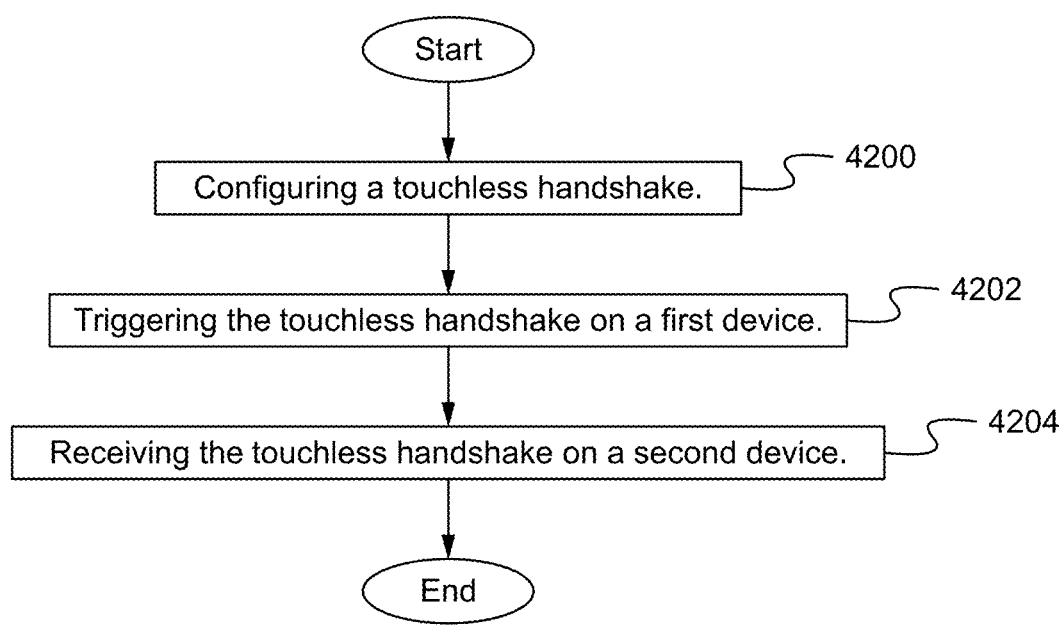
FIG. 42 shows a flowchart of a method of implementing a touchless handshake according to some embodiments.

FIG. 42 shows a flowchart of a method of implementing a touchless handshake according to some embodiments. In the step 4200, a touchless handshake is configured. Configuring the touchless handshake is able to include any information such as how long the touchless handshake lasts, how the touchless handshake is displayed (e.g., just vibrations, a specific vibration pattern, images/video/audio included), and/or any other configuration information. In the step 4202, the touchless handshake is triggered on a first device. Triggering the touchless handshake is able to be performed in any manner. For example, the touchless handshake is able to be triggered by the user holding the mobile device in a specified orientation, and moving the mobile device in a specific pattern (e.g., up and down similar to a handshake motion). In some embodiments, before the user performs the motion, a signal is sent to another device (e.g., the second device), so that the user of the second device positions her mobile device in her hand. The signal is able to be any wireless signal (e.g., ultrasonic), and the second device is able to provide an indication that a touchless handshake is forthcoming. In the step 4204, the touchless handshake is received on the second device. As described herein, the touchless handshake is a wireless signal from the first device which causes an effect on the second wireless device (e.g., vibrations). In some embodiments, fewer or additional steps are implemented. For example, confirmation of the handshake is provided to one or both devices involved in the touchless handshake. In some embodiments, the order of the steps is modified. A similar implementation is able to be performed for a wave or other virtual/touchless interaction.

Figure 43:
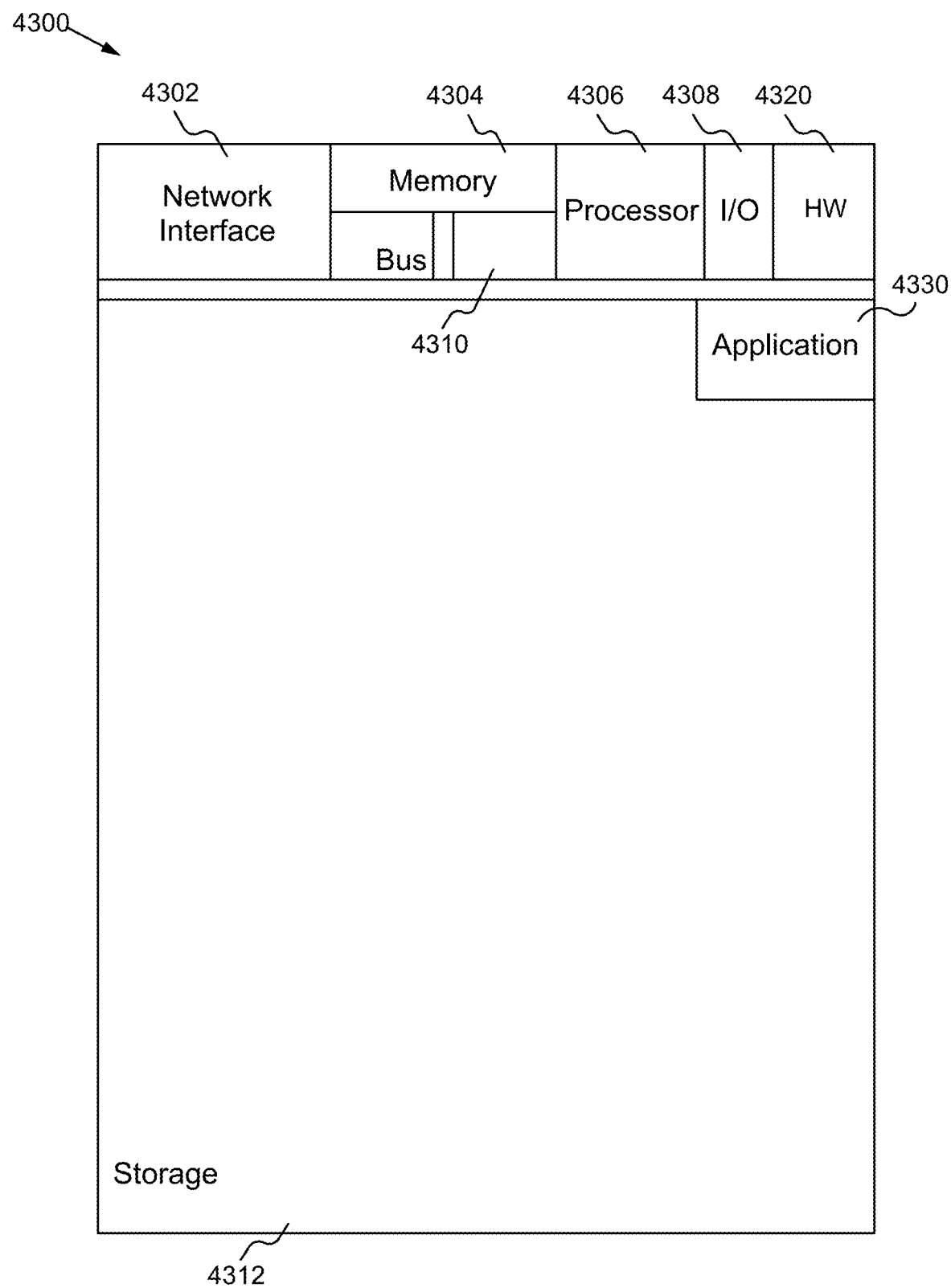
FIG. 43 shows a block diagram of an exemplary computing device configured to implement the touchless handshake method according to some embodiments.

FIG. 43 shows a block diagram of an exemplary computing device configured to implement the touchless handshake method according to some embodiments. The computing device 4300 is able to be used to acquire, store, compute, process, communicate and/or display information such as images and videos, and provide physical manifestations in a receiving device. The computing device 4300 is able to implement any of the touchless handshake aspects. In general, a hardware structure suitable for implementing the computing device 4300 includes a network interface 4302, a memory 4304, a processor 4306, I/O device(s) 4308, a bus 4310 and a storage device 4312. The choice of processor is not critical as long as a suitable processor with sufficient speed is chosen. The memory 4304 is able to be any conventional computer memory known in the art. The storage device 4312 is able to include a hard drive, CDROM, CDRW, DVD, DVDRW, High Definition disc/drive, ultra-HD drive, flash memory card or any other storage device. The computing device 4300 is able to include one or more network interfaces 4302. An example of a network interface includes a network card connected to an Ethernet or other type of LAN. The I/O device(s) 4308 are able to include one or more of the following: keyboard, mouse, monitor, screen, printer, modem, touchscreen, button interface and other devices. Touchless handshake application(s) 4330 used to implement the touchless handshake method are likely to be stored in the storage device 4312 and memory 4304 and processed as applications are typically processed. More or fewer components shown in FIG. 43 are able to be included in the computing device 4300. In some embodiments, touchless handshake hardware 4320 is included. Although the computing device 4300 in FIG. 43 includes applications 4330 and hardware 4320 for the touchless handshake method, the touchless handshake method is able to be implemented on a computing device in hardware, firmware, software or any combination thereof. For example, in some embodiments, the touchless handshake applications 4330 are programmed in a memory and executed using a processor. In another example, in some embodiments, the touchless handshake hardware 4320 is programmed hardware logic including gates specifically designed to implement the touchless handshake method.

In some embodiments, the touchless handshake application(s) 4330 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 44:
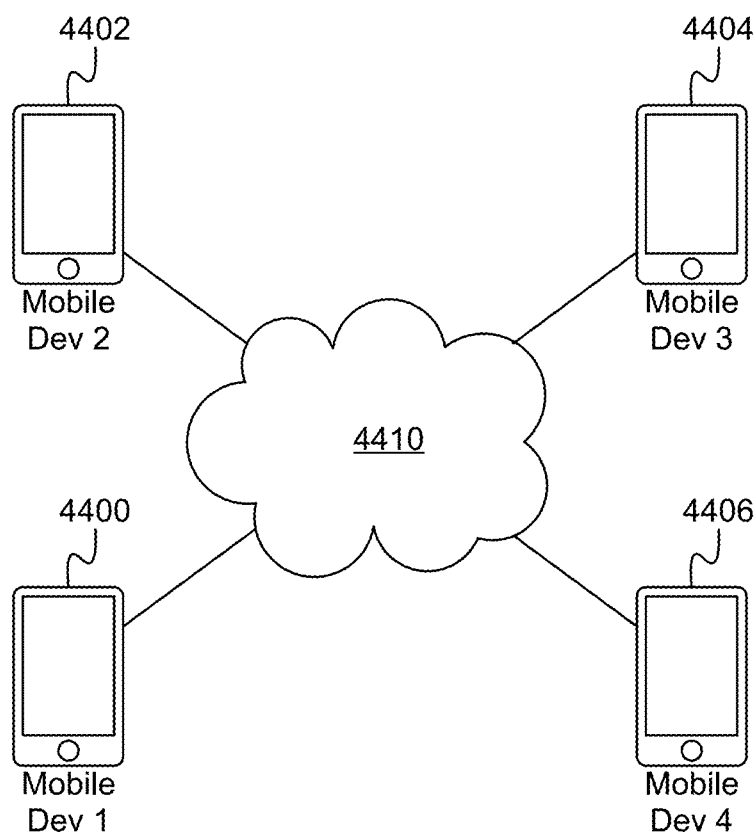
FIG. 44 shows a diagram of a network of devices implementing the touchless handshake method according to some embodiments.

FIG. 44 shows a diagram of a network of devices implementing touchless handshake method according to some embodiments. The network of devices includes a set of mobile devices 4400, 4402, 4404 and 4406. Although four mobile devices are shown, any number of devices are able to be used. A first mobile device 4400 is able to be used to send a handshake or wave to a second mobile device 4402 (or a group of mobile devices). As described herein, the mobile devices are able to communicate using ultrasonic waves or other wireless implementations. The mobile devices are able to communicate via a network 4410 (e.g., the Internet).

A mobile device implementing the touchless handshake is able to include a small motor, where the motor is built partially off-balanced (e.g., using improper weight distribution attached to the motor's shaft/axis). When the motor rotates, the irregular weight causes the phone to vibrate. In some embodiments, the motor is able to be affected by an app in a way that the vibrations are able to be controlled and/or varied so as to produce a pattern. For example, instead of merely vibrating or performing vibrations for 1 second, then turning off for 1 second, and repeating, the vibrations are able to be turned on and off to perform other patterns.

The mobile device is also able to include a device to send and receive ultrasonic signals. The ultrasonic signals are inaudible to humans but are able to be detected by other mobile devices capable of receiving ultrasonic signals.

The mobile device is able to include sensors (e.g., accelerometers, pressure sensors and/or touch sensors such as the touchscreen) to determine the orientation of the mobile device in the user's hand. For example, to best simulate a handshake, a mobile phone should be held in the palm of the user's hand in an orientation length-wise, parallel (e.g., horizontal) to the ground. The accelerometers in the mobile phone are able to determine that the mobile phone is horizontal rather than upright, and the touchscreen is able to determine that the user is gripping the mobile phone as one would grip another hand during a handshake (e.g., thumb on top and other fingers on bottom). Furthering the example, the app is able to receive sensor information that at least one finger is on the side/bottom of the mobile phone, and the mobile phone is in a horizontal orientation. In another example, pressure sensors on the sides of the mobile device are able to detect pressure on each side of the mobile device from the user squeezing the mobile device as one would with a handshake. In some embodiments, the app trains/learns a user's phone handshake by performing tests where the user is prompted to perform a handshake with the phone, and the app records the sensor information during the tests.

To utilize the touchless handshake, user devices are configured to communicate with each other (e.g., by sending an ultrasonic signal) which causes the receiving device to shake similar to a handshake feeling. In some embodiments, additional information is sent. In some embodiments, a wave is implemented instead of a touchless handshake.

In operation, the touchless handshake method enables users to perform a handshake while maintain a social distance to prevent the transmission of contagious illnesses such as Covid-19.

Anything discussed herein regarding a touchless handshake also applies to the wave implementation and/or any other implementation, and vice versa.

In some embodiments, the handshake and wave implementations are separate apps, and in some embodiments, the handshake and wave implementations are in a single app.

The app or apps described herein are able to be pre-installed on a device (e.g., incorporated with a mobile device's operating system and/or installed before shipment of the mobile device), or the app or apps are able to be downloaded and installed via a web page, mobile service such as the App Store or Google Play, or any other online service.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method comprising:
   triggering, with a first device, a touchless handshake;
   sending a wireless signal from the first device to the second device;
   receiving, with a second device, the touchless handshake; and
   acquiring a code displayed on the second device before sending the wireless signal by the first device.

2. The method of claim 1 wherein receiving the touchless handshake includes triggering a vibration mechanism of the second device.

3. The method of claim 2 wherein the first device and the second device vibrate simultaneously.

4. The method of claim 1 wherein the wireless signal comprises an ultrasonic signal.

5. The method of claim 1 further comprising performing machine learning to learn triggering the touchless handshake.

6. The method of claim 1 further comprising receiving, with at least one or more additional devices, the touchless handshake.

7. The method of claim 1 further comprising sharing contact information during the touchless handshake.

8. The method of claim 1 further comprising implementing a privacy policy to prevent sharing personal information.

9. A device comprising:
   a non-transitory memory for storing an application, the application for:
   triggering a touchless handshake;
   sending a wireless signal to a second device;
   receiving a confirmation of the touchless handshake; and
   acquiring a code displayed on the second device before sending the wireless signal by the device; and
   a processor coupled to the memory, the processor configured for processing the application.

10. The device of claim 9 wherein the application is further configured for triggering a vibration mechanism in the device.

11. The device of claim 10 wherein the device and the second device vibrate simultaneously.

12. The device of claim 9 wherein the wireless signal comprises an ultrasonic signal.

13. The device of claim 9 wherein the application is further configured for performing machine learning to learn triggering the touchless handshake.

14. The device of claim 9 wherein the application is further configured for sending the touchless handshake to at least one or more additional devices.

15. The device of claim 9 wherein the application is further configured for sharing contact information during the touchless handshake.

16. The device of claim 9 wherein the application is further configured for implementing a privacy policy to prevent sharing personal information.

17. A system comprising:
   a first device configured for:
   triggering a touchless handshake;
   sending a wireless signal; and
   a second device configured for:
   receiving the touchless handshake; and
   acquiring a code displayed on the second device before sending the wireless signal from the first device.

18. The system of claim 17 wherein receiving the touchless handshake includes triggering a vibration mechanism of the second device.

19. The system of claim 18 wherein the first device and the second device vibrate simultaneously.

20. The system of claim 17 wherein the wireless signal comprises an ultrasonic signal.

21. The system of claim 17 wherein the first device is further configured for performing machine learning to learn triggering the touchless handshake.

22. The system of claim 17 wherein the first device is further configured for sending the touchless handshake to at least one or more additional devices.

23. The system of claim 17 wherein the first device is further configured for sharing contact information during the touchless handshake.

24. The system of claim 17 wherein the first device is further configured for implementing a privacy policy to prevent sharing personal information.

* * * * *